United States Patent
Shimura

(10) Patent No.: US 10,212,011 B2
(45) Date of Patent: Feb. 19, 2019

(54) WIRELESS DEVICE AND METHOD FOR CONTROLLING PHASE

(71) Applicant: FUJITSU LIMITED, Kawasaki-shi, Kanagawa (JP)

(72) Inventor: Toshihiro Shimura, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 47 days.

(21) Appl. No.: 15/414,232

(22) Filed: Jan. 24, 2017

(65) Prior Publication Data
US 2017/0222849 A1    Aug. 3, 2017

(30) Foreign Application Priority Data

Feb. 3, 2016  (JP) .................................. 2016-018748

(51) Int. Cl.
| | |
|---|---|
| H04B 7/04 | (2017.01) |
| H04L 27/22 | (2006.01) |
| H04L 27/20 | (2006.01) |
| H04L 5/00 | (2006.01) |
| H04B 7/06 | (2006.01) |
| H04B 7/08 | (2006.01) |
| H04L 27/36 | (2006.01) |
| H04B 17/11 | (2015.01) |
| H04B 17/21 | (2015.01) |

(52) U.S. Cl.
CPC .............. *H04L 27/20* (2013.01); *H04B 7/04* (2013.01); *H04B 7/0615* (2013.01); *H04B 7/0842* (2013.01); *H04L 5/0048* (2013.01); *H04L 27/22* (2013.01); *H04L 27/368* (2013.01); *H04B 17/11* (2015.01); *H04B 17/21* (2015.01)

(58) Field of Classification Search
CPC ....... H04L 27/20; H04L 27/22; H04L 5/0048; H04B 7/04
See application file for complete search history.

(56) References Cited

U.S. PATENT DOCUMENTS

| | | | |
|---|---|---|---|
| 9,432,075 B2 * | 8/2016 | Shimura | .............. H04B 1/40 |
| 2002/0135513 A1 * | 9/2002 | Paschen | .............. H01Q 3/267 |
| | | | 342/371 |

(Continued)

FOREIGN PATENT DOCUMENTS

| | | |
|---|---|---|
| JP | 2001-007754 | 1/2001 |
| JP | 2004-012362 | 1/2004 |

(Continued)

*Primary Examiner* — Rasheed Gidado
(74) *Attorney, Agent, or Firm* — Fujitsu Patent Center

(57) ABSTRACT

A wireless device includes a plurality of antenna and a plurality of wireless modules that transmit or receive signals via the plurality of antennas. Each of the plurality of wireless modules includes: a generator that generates a high-frequency signal; and a high-frequency circuit that transmits or receives, based on the generated high-frequency signal, a signal via at least one of the plurality of antennas. The wireless device further includes a controller. The controller obtains, each time the plurality of wireless modules start generation of a plurality of the high-frequency signals, a difference of phases of the plurality of high-frequency signals, and controls, based on the obtained difference, at least one phase of a plurality of signals to be transmitted or received by the plurality of wireless modules.

18 Claims, 32 Drawing Sheets

(56) References Cited

U.S. PATENT DOCUMENTS

| | | | | |
|---|---|---|---|---|
| 2005/0129155 A1* | 6/2005 | Hoshino | .............. | H04B 7/0814 |
| | | | | 375/347 |
| 2006/0008036 A1* | 1/2006 | Moriai | ................... | H04B 1/707 |
| | | | | 375/343 |
| 2013/0040582 A1* | 2/2013 | Hamada | ............... | H04B 1/0475 |
| | | | | 455/78 |
| 2013/0059553 A1* | 3/2013 | Orihashi | ................. | H01Q 3/26 |
| | | | | 455/126 |

FOREIGN PATENT DOCUMENTS

| | | |
|---|---|---|
| JP | 2006-304205 | 11/2006 |
| JP | 2010-071889 | 4/2010 |

\* cited by examiner

WIRELESS DEVICE AND METHOD FOR CONTROLLING PHASE

CROSS-REFERENCE TO RELATED APPLICATION

This application is based upon and claims the benefit of priority of the prior Japanese Application No. 2016-018748 filed on Feb. 3, 2016 in Japan, the entire contents of which are hereby incorporated by reference.

FIELD

The embodiments discussed herein are related to a wireless device and a method for controlling a phase.

BACKGROUND

A wireless device including multiple wireless modules which receive signals via multiple antennas on the basis of a high-frequency signal has known to public (see, for example, Patent Literatures 1 and 2). The wireless device controls the differences of phases of multiple signals received by respective wireless modules by controlling the phase of at least one of the multiple signals received by the respective wireless modules.
[Patent Literature 1] Japanese Laid-open Patent Publication No. 2010-071889
[Patent Literature 2] Japanese Laid-open Patent Publication No. 2006-304205

SUMMARY

An admissible wireless device may have a configuration that a high-frequency signal generated by a generator is transmitted to each of the multiple wireless modules and each of the multiple wireless modules receives a signal on the basis of the transmitted high-frequency signal. However, a high-frequency signal easily interferes with another signal in the wireless device and is easily attenuates while propagating. Furthermore, increase in the number of wireless modules makes the issues of interference and attenuations more pronounced. As a solution to the above, such a generator may be provided for each wireless module.

For example, a Phase Locked Loop (PLL) is sometimes used to generate a high-frequency signal. In order to control a ratio (in other words, division ratio) of the frequency of an output signal to the frequency of an input signal, a PLL uses, for example, a count value obtained by counting the number of cycles of the output signal. For example, the multiple wireless modules have a common division ratio.

In a wireless device that includes multiple generators provided one for each of the wireless modules, since the timings of starting and ending operation of the PLL are different with wireless modules, repetitious starting and ending of the operation of the wireless device may cause the count values of the respective wireless modules to be different one another at a certain time point. Accordingly, in cases where the wireless device starts its operation, high-frequency signals respectively generated by the multiple wireless modules may have different phases from one another with the wireless modules.

For the above, repetitious starting and ending of the operation of the wireless device may deviate the phase differences among multiple signals respectively received by the multiple wireless modules. This sometimes degrades the quality of the wireless signals.

This problem also arises in a wireless device including wireless modules that transmit signals.

According to an aspect of the embodiments, a wireless device includes a plurality of antenna and a plurality of wireless modules that transmit or receive signals via the plurality of antennas.

Each of the plurality of wireless modules includes: a generator that generates a high-frequency signal; and a high-frequency circuit that transmits or receives, based on the generated high-frequency signal, a signal via at least one of the plurality of antennas.

The controller obtains, each time the plurality of wireless modules start generation of a plurality of the high-frequency signals, a difference of phases of the plurality of high-frequency signals, and controls, based on the obtained difference, at least one phase of a plurality of signals to be transmitted or received by the plurality of wireless modules.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF THE PREFERRED EMBODIMENTS

Hereinafter, embodiments of the present invention will now be described with reference to the accompanying drawings. The following embodiments are exemplary, so there is no intention to exclude application of various modifications and techniques not suggested in the following description to the embodiment. Throughout accompanying drawings of the embodiments, like reference numbers designate the same or substantially identical parts and elements.

First Embodiment (Configuration)

Figure 1:
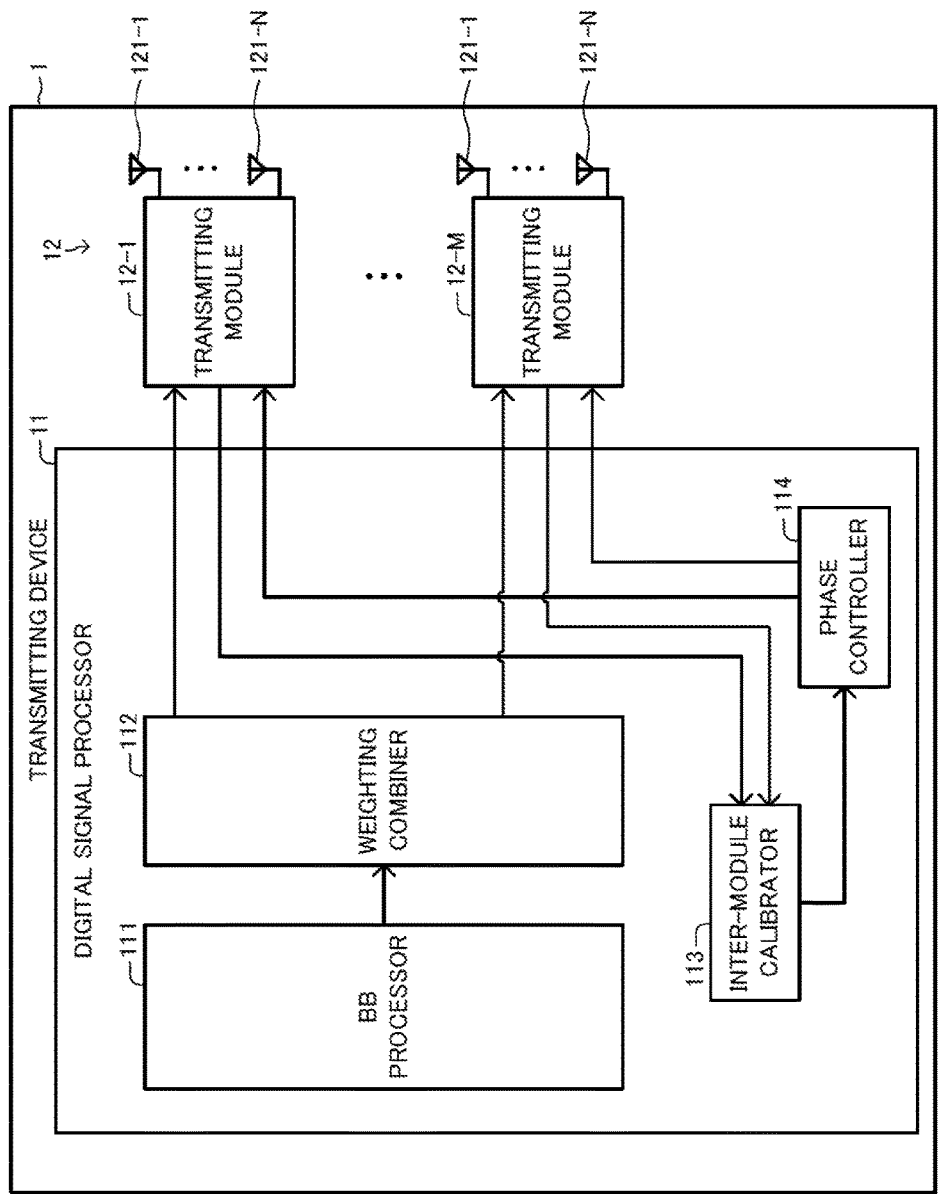
FIG. 1 is a block diagram schematically illustrating an example of the configuration of a transmitting device according to a first embodiment.

As illustrated in FIG. 1, a transmitting device 1 of the first embodiment includes, for example, a digital signal processor 11 and a transmitter 12. The transmitting device 1 is an example of a wireless device.

The digital signal processor 11 includes a BaseBand (BB) processor 111, a weighting combiner 112, an inter-module calibrator 113, and a phase controller 114. The weighting combiner 112 may also be referred to as a weighting combiner-divider or a weighting divider. The combination of the inter-module calibrator 113 and the phase controller 114 is an example of a controller.

The transmitter 12 includes M transmitting modules 12-1, . . . , and 12-M. In this example, the symbol M represents an integer of two or more. Hereinafter, when there is no need to discriminate a transmitting module 12-$m$ from the remaining transmitting modules, the transmitting module 12-$m$ is also referred to as the transmitting module 12. Here, the symbol m represents each of integers from 1 to M.

The BB processor 111 generates P BB signals. In this example, the symbol P represents an integer of one or more, and the P BB signals may form P data streams. The BB processor 111 outputs the P generated BB signals to the weighting combiner 112.

The weighting combiner 112 carries out the weighting and combining process on P BB signals input from the BB processor 111 to generate M BB signals. In this example, the weighting and combining process includes a process of modifying the phase and the amplitude of each BB signal; and a process of multiplying the P BB signal by a precoding matrix. For example, as denoted by Expression 1, the weighting combiner 112 generates an m-th BB signal $x_m$. The term $s_p$ represents the p-th BB signal input into the weighting combiner 112; and the term $w_{m,p}$ represents an element of the precoding matrix in the m-th row and the p-th column.

$$x_m = \sum_{p=1}^{P} w_{m,p} s_p \qquad \text{[Expression 1]}$$

The weighting combiner 112 outputs the M generated BB signals to the M transmitting modules 12-1, . . . , and 12-M, respectively.

Figure 2:
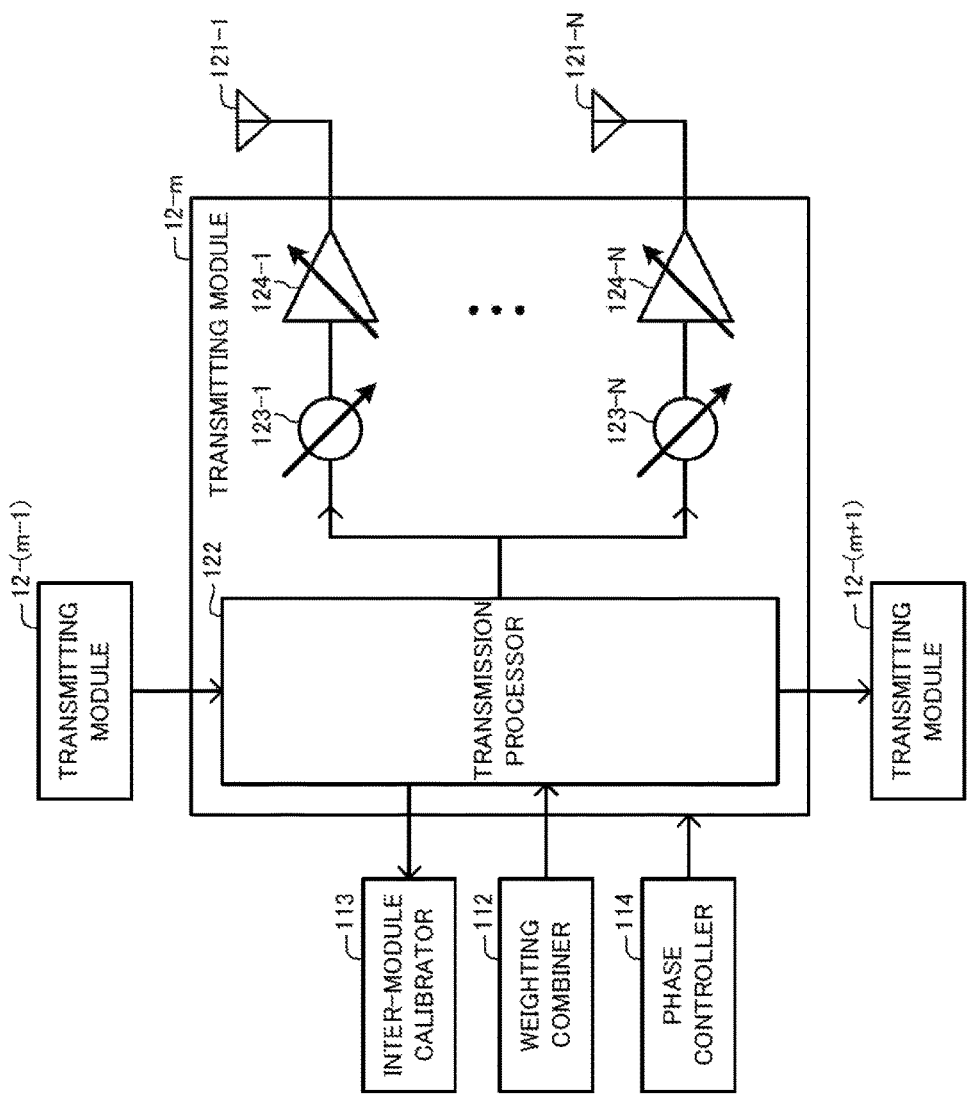
FIG. 2 is a block diagram schematically illustrating an example of the configuration of a transmitting module of FIG. 1.

For example, as illustrated in FIG. 2, the transmitting module 12-$m$ includes N antennas 121-1, . . . , and 121-N, a transmission processor 122, N phase shifters 123-1, . . . , and 123-N; and N amplitude modifiers 124-1, . . . , and 124-N. In this example, the symbol N represents an integer of one or more. Hereinafter, when there is no need to discriminate the antenna 121-$n$, the phase shifter 123-$n$, and the amplitude modifier 124-$n$ from the remaining elements of the respective same types, these elements may also be referred to as the antenna 121, the phase shifter 123, and the amplitude modifier 124, respectively. Here, the symbol n represents each of integers from 1 to N.

The number N of the antennas 121-1, . . . , and 121-N may be different with the transmitting modules 12.

The transmission processor 122 generates a high-frequency signal and generates a modulated signal by modulating the generated high-frequency signal on the basis of a BB signal input from the weighting combiner 112. In this example, the high-frequency signal has a frequency in the range of the millimeter wave band. Alternatively, the frequency of the high-frequency signal may be in the range of a different frequency band from the millimeter wave band.

The transmission processor 122 outputs the modulated signal to each of the N phase shifters 123-1, . . . , and 123-N.

The phase shifter 123-*n* shifts the phase of the modulated signal input from the transmission processor 122, and outputs the shifted modulated signal to the amplitude modifier 124-*n*.

The amplitude modifier 124-*n* modifies the amplitude of the modulated signal input from the phase shifter 123-*n* and outputs the modified modulated signal to the antenna 121-*n*.

The transmitting module 12-*m* transmits signals through the N antennas 121-1, . . . , and 121-N.

The transmitting device 1 forms beams by controlling the phases and the amplitudes of signals to be transmitted through the N antennas 121-1, . . . , and 121-N of each of the M transmitting modules 12-1, . . . , and 12-M. For example, the transmitting device 1 may control the directions of the beam independently in each of two directions perpendicular to each other.

The multiple antennas (in this example, N·M antennas) 121 included in the transmitting device 1 can be regarded as a phased array antenna.

For example, a signal transmitted from the transmitting device 1 is received by a receiving device. In this case, the transmitting device 1 wirelessly communicates with the receiving device.

The transmitting device 1 may be a radar device that wirelessly transmits a signal and also detects the location of an object by detecting a signal which is transmitted from the transmitting device 1 and is reflected on the object. In this case, the transmitting device 1 may omit the function of modulating a high-frequency signal on the basis of the BB signal.

Figure 3:
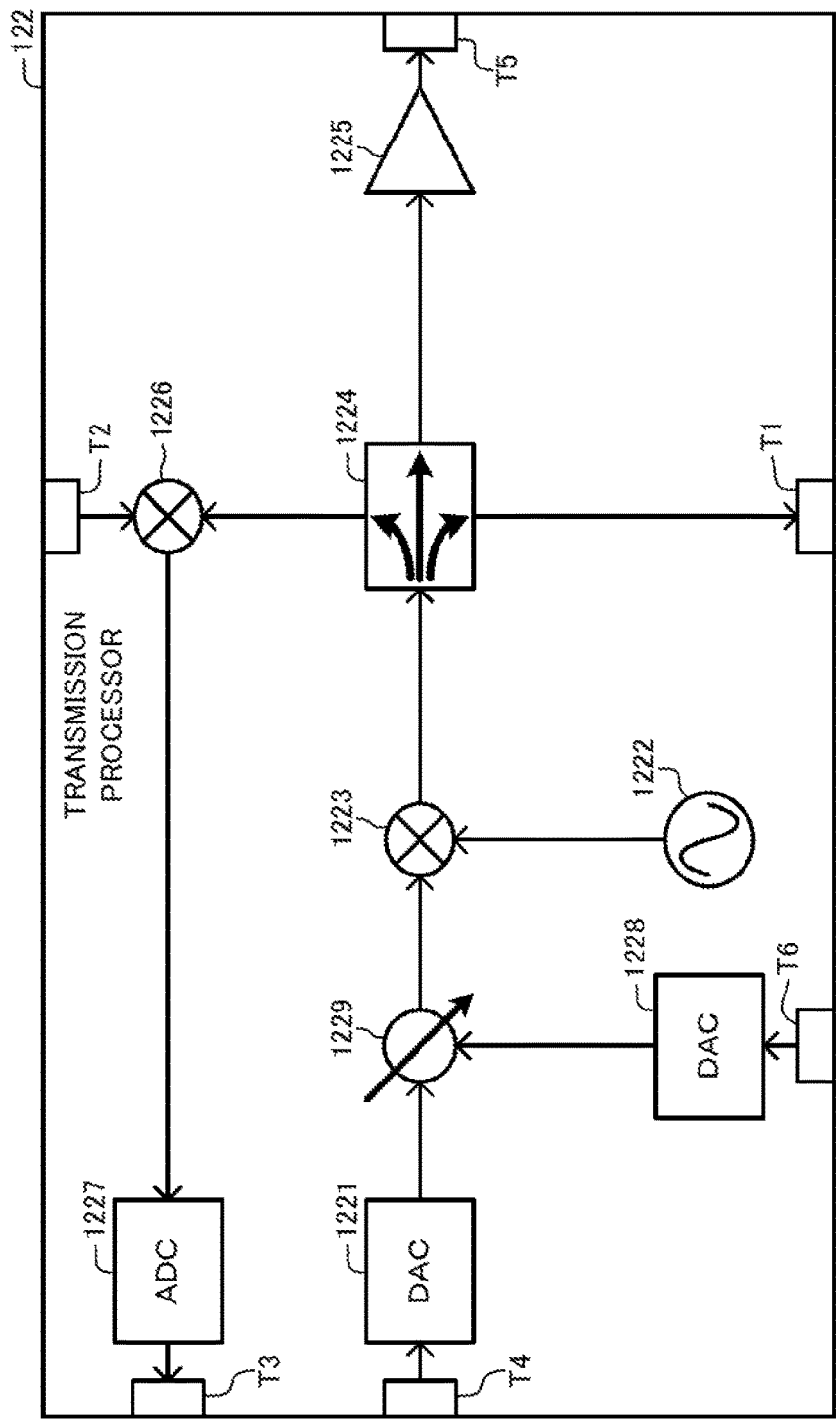
FIG. 3 is a block diagram schematically illustrating an example of the configuration of a transmission processor of FIG. 2.

For example, as illustrated in FIG. 3, the transmission processor 122 includes six terminals T1-T6, a Digital To Analog Converter (DAC) 1221, a generator 1222, a modulator 1223, a divider 1224, an amplifier 1225, a comparator 1226, an Analog To Digital Converter (ADC) 1227, a DAC 1228, and a phase shifter 1229. The modulator 1223 and the amplifier 1225 are at least part of a high-frequency circuit.

Into a terminal T4, a BB signal is input from an entity (in this example, the weighting combiner 112) external to the local transmitting module 12-*m* that includes the terminal T4. The terminal T4 is regarded as an example of an input terminal. The terminal T4 outputs the input BB signal to the DAC 1221.

The DAC 1221 converts the BB signal input from the terminal T4 from a digital signal to an analog signal. The DAC 1221 outputs the converted BB signal to the phase shifter 1229, which will be detailed below.

The generator 1222 generates a high-frequency signal. Into the generator 1222 of each transmitting module 12 of this example, an oscillation signal generated by a non-illustrated oscillator is input. In this example, the oscillation signal has a frequency lower than that of the high-frequency signal. The generator 1222 of this example includes a Phase Locked Loop (PLL). In this example, a ratio of the frequency of an input signal to the frequency of an output signal in the generator 1222 is common to the M transmitting modules 12-1, . . . , and 12-M. The generator 1222 outputs the generated high-frequency signal to the modulator 1223.

The modulator 1223 generates a modulated signal by modulating the high-frequency signal input from the generator 1222 on the basis of a signal input from the phase shifter 1229. The modulator 1223 of this example includes a mixer. The modulator 1223 outputs the generated modulated signal to the divider 1224.

The divider 1224 divides the modulated signal input from the modulator 1223 into multiple (in this example, three) divided signals. Among the multiple divided signals, the divider 1224 outputs a first divided signal to the terminal T1; outputs a second divided signal to the comparator 1226; and outputs a third divided signal to the amplifier 1225.

A terminal T1 outputs the first divided signal input from the divider 1224 to an entity (in this example, the terminal T2 of the transmitting module 12-(*m*+1), where m represents an integer equal to or less than M−1) external to the local transmitting module 12-*m* that includes the terminal T1. The terminal T1 is an example of a first terminal.

The amplifier 1225 amplifies the third divided signal input from the divider 1224 and outputs the amplified signal to the terminal T5.

The terminal T5 outputs the signal input from the amplifier 1225 to an entity (in this example, each of the N phase shifters 123-1, . . . , 123-N) external to the local transmitting module 12-*m* that includes the terminal T5. The terminal T5 is an example of an output terminal.

Into the terminal T2, a signal is input from an entity (in this example, the terminal T1 of the transmitting module 12-(*m*−1), where m represents an integer of two or more) external to the local transmitting module 12-*m* that includes the terminal T2. Here, the transmitting module 12-(*m*−1) is an example of another transmitting module 12 different from the transmitting module 12-*m*. The terminal T2 is an example of a second terminal. The terminal T2 outputs the input signal to the comparator 1226.

The comparator 1226 outputs a difference signal representing a difference of the phase of the signal input from the terminal T2 and the phase of the second divided signal input from the divider 1224 to the ADC 1227. The comparator 1226 of this example includes a mixer.

The ADC 1227 converts the difference signal input from the comparator 1226 from an analog signal to a digital signal. The ADC 1227 outputs the converted difference signal to the terminal T3.

The terminal T3 outputs the difference signal input from the ADC 1227 to an entity (in this example, the inter-module calibrator 113) external to the local transmitting module 12-*m* that includes the terminal T3. The terminal T3 is an example of a third terminal.

Into a terminal T6, a control signal is input from an entity (in this example, the phase controller 114) external to the local transmitting module 12-*m* that includes the terminal T6. The control signal in this example indicates a phase shift amount. In this example, a phase shift amount represents an amount of a phase to be shifted by the phase shifter 1229. The terminal T6 outputs the input control signal to the DAC 1228.

The DAC 1228 converts the control signal input from the terminal T6 from a digital signal to an analog signal. The DAC 1228 outputs the converted control signal to the phase shifter 1229.

The phase shifter 1229 shifts the phase of a signal input from the DAC 1221 on the basis of the control signal input from the DAC 1228. In this example, the phase shifter 1229 shifts the phase of the signal input from the DAC 1221 by a phase shift amount represented by the control signal input from the DAC 1228. Then the phase shifter 1229 outputs the shifted signal to the modulator 1223. In other words, the phase shifter 1229 of this example shifts the phase of a signal between the input terminal T4 and the modulator 1223.

The inter-module calibrator 113 obtains the differences in phase among the M high-frequency signals each time the M transmitting modules 12-1, . . . , and 12-M start generation of the M high-frequency signals. In this example, the phase difference represented by a difference signal input from the transmitting module 12-(m+1) is the difference between the phase of the high-frequency signal generated by the transmitting module 12-m and the phase of the high-frequency signal generated by the transmitting module 12-(m+1).

The inter-module calibrator 113 determines the phase correction amount for each transmitting module 12 on the basis of the obtained differences among the phases of the M high-frequency signals. In this example, the inter-module calibrator 113 adjusts the phase correction amounts for the transmitting modules 12-2, . . . , and 12-M on the basis of the phase differences represented by the difference signals input from the transmitting modules 12-2, . . . , and 12-M, respectively. The inter-module calibrator 113 outputs a signal representing the phase correction amount determined for each transmitting module 12 to the phase controller 114.

The phase controller 114 determines the phase shift amount for each transmitting module 12 on the basis of the phase correction amount for each transmitting module 12 represented by the signal input from the inter-module calibrator 113. In this example, the phase controller 114 determines the phase shift amount for each transmitting module 12 by adding the phase correction amount to a base shift amount predetermined in accordance with the direction of the beam formed by the transmitting device 1.

The phase controller 114 outputs a control signal representing the phase shift amount determined for each transmitting module 12 to the transmitting module 12. This allows the phase controller 114 to control the phase shifter 1229 included in each transmitting module 12.

In this embodiment, the inter-module calibrator 113 and the phase controller 114 carry out the initial process when carrying out the phase control for the first time (e.g., when the transmitting device 1 operates for the first time).

In this example, the initial process includes: a process of obtaining, when the differences among the phases of the M signals respectively transmitted by the M transmitting modules 12-1, . . . , and 12-M coincide with a predetermined reference value, the differences (in other words, output phase differences) of the phases of the M high-frequency signals; and a process of memorizing the obtained output phase differences as the reference differences.

In this example, whether the differences of the phases of the M signals coincide with the reference value is determined on the basis of the receiving power or the phase of signals emitted from the multiple (in this example, M·N) antennas 121-1, . . . , and 121-N and also received at an entity external to the transmitting device 1. For example, the signals may be emitted from at least one of antennas 121-1, . . . , and 121-N of each of the transmission modules 12. For example, the result of the determination may be input into the transmitting device 1 by the user of the transmitting device 1.

In this example, the inter-module calibrator 113 and the phase controller 114 carry out a non-initial process after carrying out the initial process.

In this example, the non-initial process includes a process of controlling phases on the basis of the differences between the differences (in other words, output phase differences) of the phases of the M high-frequency signals and the memorized reference difference.

The digital signal processor 11 functions by means of a Large Scale Integration (LSI). The digital signal processor 11 of this example includes a non-volatile memory that stores an initial flag set to a predetermined "on" value in advance.

Alternatively, the digital signal processor 11 functions by means of a Programmable Logic Device (PLD). Further alternatively, the digital signal processor 11 may include a processor and a memory, and at least part of function of the digital signal processor 11 is achieved by the processor executing a program stored in the memory.

An example of the processor is a Central Processing Unit (CPU) or a Digital Signal Processor (DSP). An example of the memory is at least one of a Random Access Memory (RAM), a Read Only Memory (ROM), a Hard Disk Drive (HDD), a Solid State Drive (SSD), a semiconductor memory, and an organic memory. Alternatively, the memory may include a recording medium such as a flexible disk, an optical disk, a magneto-optical disk, or a semiconductor memory, and a reader capable of reading information from the recording medium.

(Operation)

Here, description will now be made in relation to an example of the operation of the transmitting device 1. Here, the operation of the transmitting device 1 can be regarded as one achieved by the function of the transmitting device 1.

Upon starting its operation, the transmitting device 1 starts power supply to each of the M transmission modules 12-1, . . . , and 12-M, which responsively start the generation of high-frequency signals in the respective generators 1222 included in the M transmission modules 12-1, . . . , and 12-M.

Figure 4:
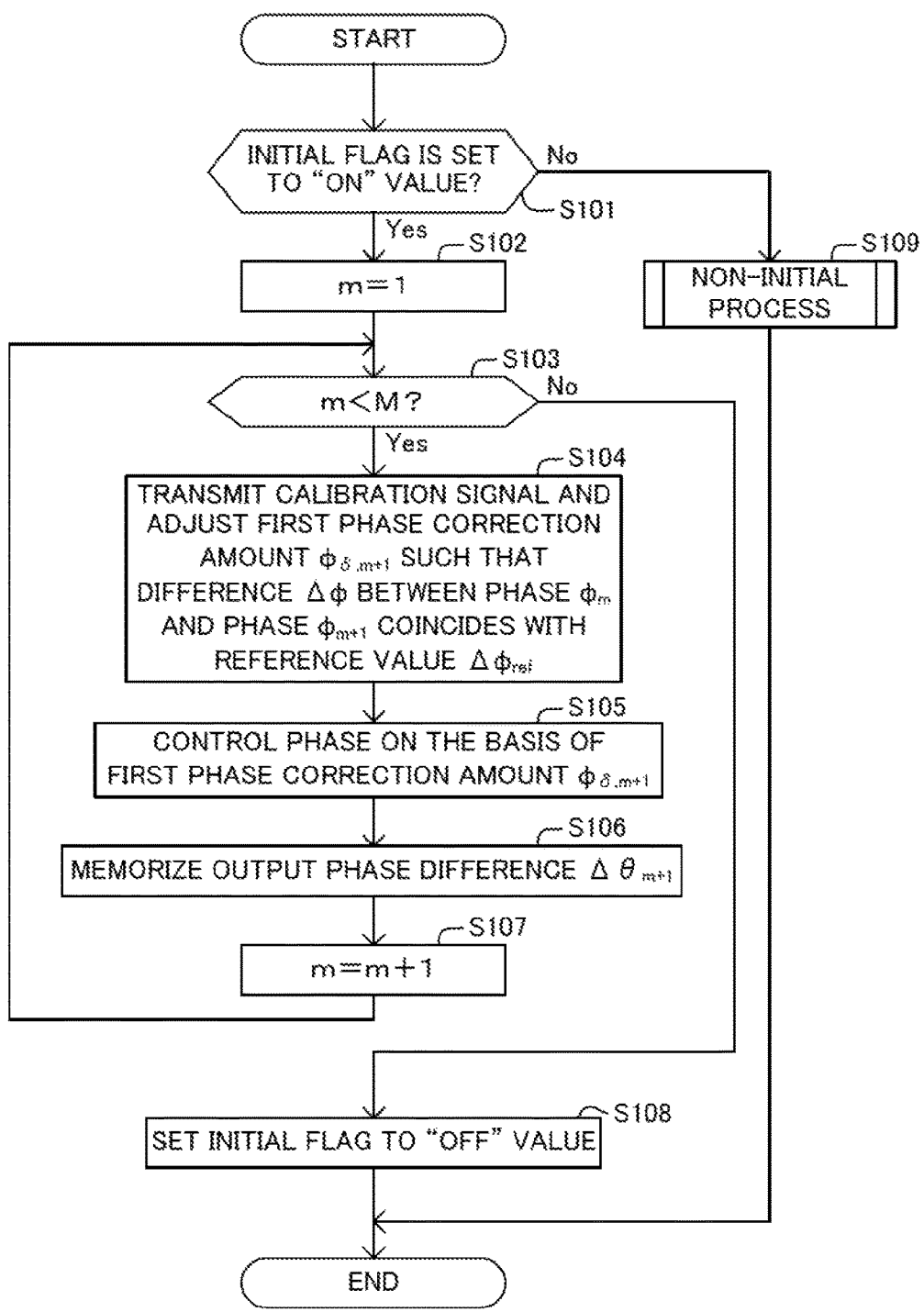
FIG. 4 is a flow diagram denoting an example of a process carried out by a digital signal processor of FIG. 1.

When the transmitting device 1 starts its operation, the digital signal processor 11 carries out the process denoted in FIG. 4.

First of all, the description will now be made on the assumption that the digital signal processor 11 carries out phase control for the first time (in this example, the transmitting device 1 operates for the first time).

The digital signal processor 11 determines whether the initial flag is set to the "on" value (step S101 of FIG. 4). At this time, since an initial flag is set to the "on" value, the digital signal processor 11 determines "Yes" and sets a loop counter m to one (step S102 of FIG. 4).

Next, the digital signal processor 11 determines whether the loop counter m is less than the number M of transmitting modules 12 (step S103 of FIG. 4). At this time, since the loop counter m is less than the number M of transmitting modules 12, the digital signal processor 11 determines "Yes".

Then, the digital signal processor 11 controls the BB processor 111 such that a calibration signal is to be transmitted. In this example, the calibration signal is the high-frequency signal being generated by the generator 1222 but not being modulated. In other words, the high-frequency signal not being modulated is a Continuous Wave (CW) or a non-modulated continuous wave. Alternatively, the calibration signal may be a signal obtained by modulating the high-frequency signal generated by the generator 1222.

Accordingly, the transmitting device 1 transmits the calibration signal from each of the M transmission modules 12-1, . . . , and 12-M.

In this embodiment, a non-illustrated receiving device is arranged at a position in the predetermined direction extending from the transmitting device 1. The receiving device detects the receiving powers or the phases of the received calibration signals transmitted from the respective transmitting modules 12-$m$ and 12-$(m+1)$. The receiving device determines whether the signal phase difference $\Delta\phi$ coincides with a predetermined reference value $\Delta\phi_{ref}$ (e.g., 0°) on the basis of the detected receiving powers and the detected phases of the received signals and outputs information representing the result of the determination. The signal phase difference $\Delta\phi$ of this example is the difference between the phase $\phi_m$ of the calibration signal transmitted from the transmitting module 12-$m$ and the phase $\phi_{m+1}$ of the calibration signal transmitted from the transmitting module 12-$(m+1)$.

The user of the transmitting device 1 inputs the result of the determination represented by the information output from the receiving device into the transmitting device 1. Alternatively, the result of the determination may be directly input from the receiving device into the transmitting device 1.

The digital signal processor 11 adjust the phase correction amount $\phi_{\delta,m+1}$ for the transmitting module 12-$(m+1)$ such that the difference $\Delta\phi$ coincides with the reference value $\Delta\phi_{ref}$ (step S104 of FIG. 4). The phase correction amount $\phi_{\delta,m+1}$ may be referred to as a first phase correction amount $\phi_{\delta,m+1}$.

The digital signal processor 11 determines the phase shift amount for the transmitting module 12-$(m+1)$ by adding the adjusted first phase correction amount $\phi_{\delta,m+1}$ to the basic shift amount. Then the digital signal processor 11 outputs a control signal representing the determined phase shift amount to the transmitting module 12-$(m+1)$.

In this example, the phase shifter 1229 of the transmitting module 12-$(m+1)$ shifts the phase of a signal input from the DAC 1221 by the phase shift amount represented by the control signal input from the digital signal processor 11. Consequently, the digital signal processor 11 controls the phase of a signal to be transmitted from the transmitting module 12-$(m+1)$ (step S105 of FIG. 4).

Next, the digital signal processor 11 obtains the phase difference (in other words, output phase difference) $\Delta\theta_{m+1}$ represented by a difference signal input from the transmitting module 12-$(m+1)$ and memorizes the obtained output phase difference $\Delta\theta_{m+1}$ as the reference difference into the non-volatile memory (step S106 of FIG. 4).

The digital signal processor 11 adds one to the loop counter m (step S107 of FIG. 4), and then returns to step S103 to repeat the process of steps S103 to S107.

When the loop counter m reaches the value equal to or more than the number M of transmitting modules 12, the digital signal processor 11 determines "No" in step S103 and sets the initial flag to a predetermined "off" value (step S108 of FIG. 4) to complete the process of FIG. 4. In this example, the process of steps S102-S108 corresponds to the initial process.

Description will now be made on the assumption that the transmitting device 1 ends its operation after the execution of the initial process and then restarts its operation.

Likewise the above case, the transmitting device 1 starts power supply to each of the M transmitting modules 12-1, . . . , and 12-M, which responsively start the generation of high-frequency signals in the respective generators 1222 included in the M transmission modules 12-1, . . . , and 12-M.

Figure 5:
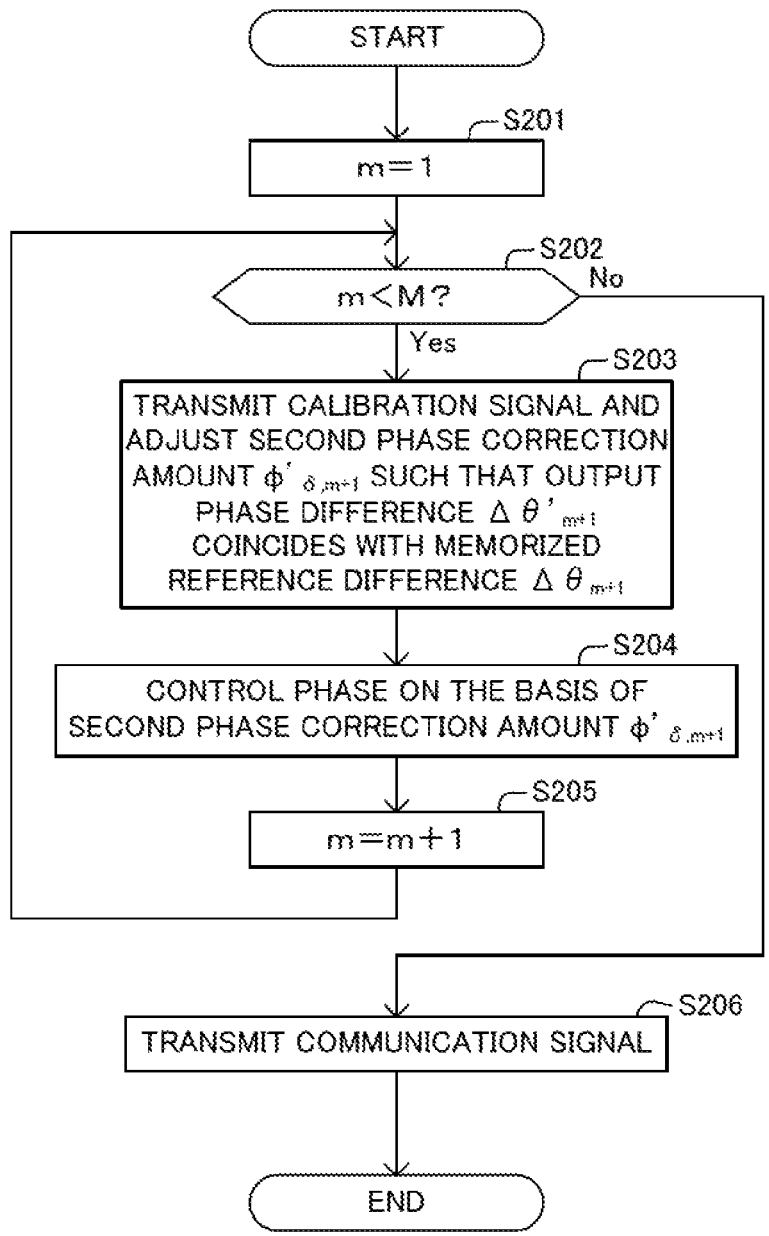
FIG. 5 is a flow diagram denoting an example of a process carried out by a digital signal processor of FIG. 1.

At this time, since the initial flag is set to the "off" value, the digital signal processor 11 determines "No" in the step S101 of FIG. 4, and carries out a non-initial process denoted in FIG. 5 (step S109 of FIG. 4).

In the non-initial process, the digital signal processor 11 sets the loop counter m to one (step S201 of FIG. 5).

Next, the digital signal processor 11 determines whether the loop counter m is less than the number M of transmitting modules 12 (step S202 of FIG. 5). At this time, since the loop counter m is less than the number M of transmitting modules 12, the digital signal processor 11 determines "Yes".

Then, the digital signal processor 11 controls the BB processor 111 such that a calibration signal is transmitted. Accordingly, the transmitting device 1 transmits the calibration signal from each of the M transmitting modules 12-1, . . . , and 12-M.

The digital signal processor 11 obtains the phase difference (in other words, output phase difference) $\Delta\theta'_{m+1}$ represented by a difference signal input from the transmitting module 12-$(m+1)$. The digital signal processor 11 adjusts the phase correction amount $\phi'_{\delta,m+1}$ for the transmitting module 12-$(m+1)$ such that the obtained output phase difference $\Delta\theta'_{m+1}$ coincides with the memorized reference difference $\Delta\theta_{m+1}$ (step S203 of FIG. 5). The phase correction amount $\phi'_{\delta,m+1}$ may be referred to as a second phase correction amount $\phi'_{\delta,m+1}$.

The process of step S203 of FIG. 5 is an example of a phase adjusting process. The phase adjusting process in this embodiment includes the processes of: selecting the transmitting module 12-$m$ as a reference module; selecting the transmitting module 12-$(m+1)$ as a comparative module; obtaining the difference $\Delta\theta'_{m+1}$ between the phase of the high-frequency signal generated by the generator 1222 of the reference module and the phase of the high-frequency signal generated by the generator 1222 of the comparative module; and adjusting the phase of a signal to be transmitted from the comparative module on the basis of the obtained difference $\Delta\theta'_{m+1}$.

As to be detailed below, the digital signal processor 11 of this example controls the phases by repeating the phase adjusting process in such a manner that each of the transmitting modules 12-1, . . . , and 12-M is selected as at least one of a reference module and a comparative module. In this example, the digital signal processor 11 successively carries out M−1 phase adjusting processes and selects a transmitting module that has been selected as a comparative module for the previous phase adjusting process as a reference module for the current phase adjusting process.

The digital signal processor 11 determines the phase shift amount for the transmitting module 12-$(m+1)$ by adding the adjusted second phase correction amount $\phi'_{\delta,m+1}$ to the basic shift amount and then outputs a control signal representing the determined phase shift amount to the transmitting module 12-$(m+1)$.

In this example, the phase shifter 1229 of the transmitting module 12-$(m+1)$ shifts the phase of a signal input from the DAC 1221 by the phase shift amount represented by the control signal input from the digital signal processor 11. Consequently, the digital signal processor 11 controls the phase of a signal to be transmitted from the transmitting module 12-$(m+1)$ (step S204 of FIG. 5).

The digital signal processor 11 adds one to the loop counter m (step S205 of FIG. 5), and then returns to step S202 to repeat the process of steps 202 to S205.

When the loop counter m reaches the value equal to or more than the number M of the transmitting modules 12, the digital signal processor 11 determines "No" in step S202 and transmits a communication signal from each of the M transmitting modules 12-1, . . . , and 12-M (step S206 of FIG. 5). The communication signal is a signal obtained by modulating the high-frequency signal generated by the generator 1222.

In this example, until the transmitting device 1 finishes its operation, the phase shift amount used for transmitting a communication signal in each transmitting module 12 is kept to be a constant value (in other words, value determined in step S204 of FIG. 5). Alternatively, the phase shift amount may be changed with a change in the basic shift amount.

After that, the digital signal processor 11 ends the process of FIG. 5. Consequently, the digital signal processor 11 ends the process of FIG. 4.

As described above, the transmitting device 1 of the first embodiment obtains differences among the phases of the M high-frequency signals each time the M transmitting modules 12-1, . . . , and 12-M start generation of the M high-frequency signals. Further, the transmitting device 1 controls the phase of at least one of M signals to be respectively transmitted from the M transmitting modules 12-1, . . . , and 12-M on the basis of the obtained differences.

This can calibrate the differences of the phases of the M signals to be respectively transmitted from the M transmitting modules 12-1, . . . , and 12-M each time the M transmitting modules 12-1, . . . , and 12-M start generation of the M high-frequency signals. Accordingly, it is possible to suppress the deviation of the differences of the phases of the above M signals, which deviation is accompanied by the start and the end of the operation of the transmitting device 1. Consequently, the quality of signals wirelessly transmitted can be enhanced.

The transmitting device 1 of the first embodiment obtains, when the difference of the phases of the M signals respectively transmitted by the M transmitting modules 12-1, . . . , and 12-M coincides with the predetermined reference value, the difference of the phases of the M high-frequency signals of the M transmitting modules 12-1, . . . , and 12-M. Further, the transmitting device 1 memorizes the obtained difference as a reference difference, and after memorizing the reference difference, controls the phase on the basis of the difference of the phases of the M high-frequency signals and the memorized reference difference.

This enables the transmitting device 1 to calibrate, after memorizing the reference difference, the difference of the phases of the above M signals without detecting the receiving powers or the phases of receiving signals at a particular position external to the transmitting device 1. Accordingly, it is possible to suppress the deviation of the difference of the phases of the above M signals, which deviation is accompanied by the start and the end of the operation of the transmitting device 1.

Furthermore, in the transmitting device 1 of the first embodiment, a determination as to whether the difference of the above M signals coincides with the reference value is made on the basis of the receiving power or the phase of a signal emitted from multiple antennas and received at a location external to the transmitting device 1.

This makes it possible to precisely determine whether the difference of the above M signals coincides with the reference value. Accordingly, it is possible to suppress the deviation of the difference of the phases of the above M signals, which deviation is accompanied by the start and the end of the operation of the transmitting device 1. Consequently, the quality of signals wirelessly transmitted can be enhanced.

Furthermore, in the transmitting device 1 of the first embodiment, each of the M transmitting modules 12-1, . . . , and 12-M includes a first terminal T1, a second terminal T2, a comparator 1226, and a third terminal T3. The first terminal T1 outputs a high-frequency signal generated by the generator 1222 of the transmitting module 12-*m* to an entity external to the transmitting module 12-*m*.

Into the second terminal T2, a high-frequency signal generated by the generator 1222 of a transmitting module 12-(*m*−1) different from the transmitting module 12-*m* is input from an entity external to the transmitting module 12-*m*. The comparator 1226 outputs a difference signal representing a difference between the phase of the input high-frequency signal and the phase of the high-frequency signal generated by the generator 1222 of the local transmitting module 12-*m*. The third terminal T3 outputs the difference signal to an entity external to the transmitting module 12-*m*.

This allows the transmitting modules 12-1, . . . , and 12-M to have a common configuration, so that the production cost of the transmitting device 1 can be suppressed.

Furthermore, in the transmitting device 1 of the first embodiment, each of the M transmitting modules 12-1, . . . , and 12-M includes the phase shifter 1229 that shifts the phase of a signal between the input terminal T4 and the modulator 1223. Furthermore, the transmitting device 1 controls the phase by controlling the phase shifter 1229.

This allows the phase shift by the phase shifter 1229 to reflect in a signal to be input into the comparator 1226. In other words, the transmitting device 1 controls phases in a feed-back control method. This can precisely calibrate the difference of the phases of the above M signals. Accordingly, it is possible to suppress the deviation of the difference of the phases of the above M signals, which deviation is accompanied by the start and the end of the operation of the transmitting device 1. Consequently, the quality of signals wirelessly transmitted can be enhanced.

The transmitting device 1 of the first embodiment successively carries out M−1 phase adjusting processes and selects a transmitting module 12 that has been selected as a comparative module for the previous phase adjusting process as a reference module for the current phase adjusting process.

This can reduce a memory region used for the M−1 phase adjusting processes and the load of executing the M−1 phase adjusting processes as compared to executing the M−1 phase adjusting processes in parallel.

Figure 6:
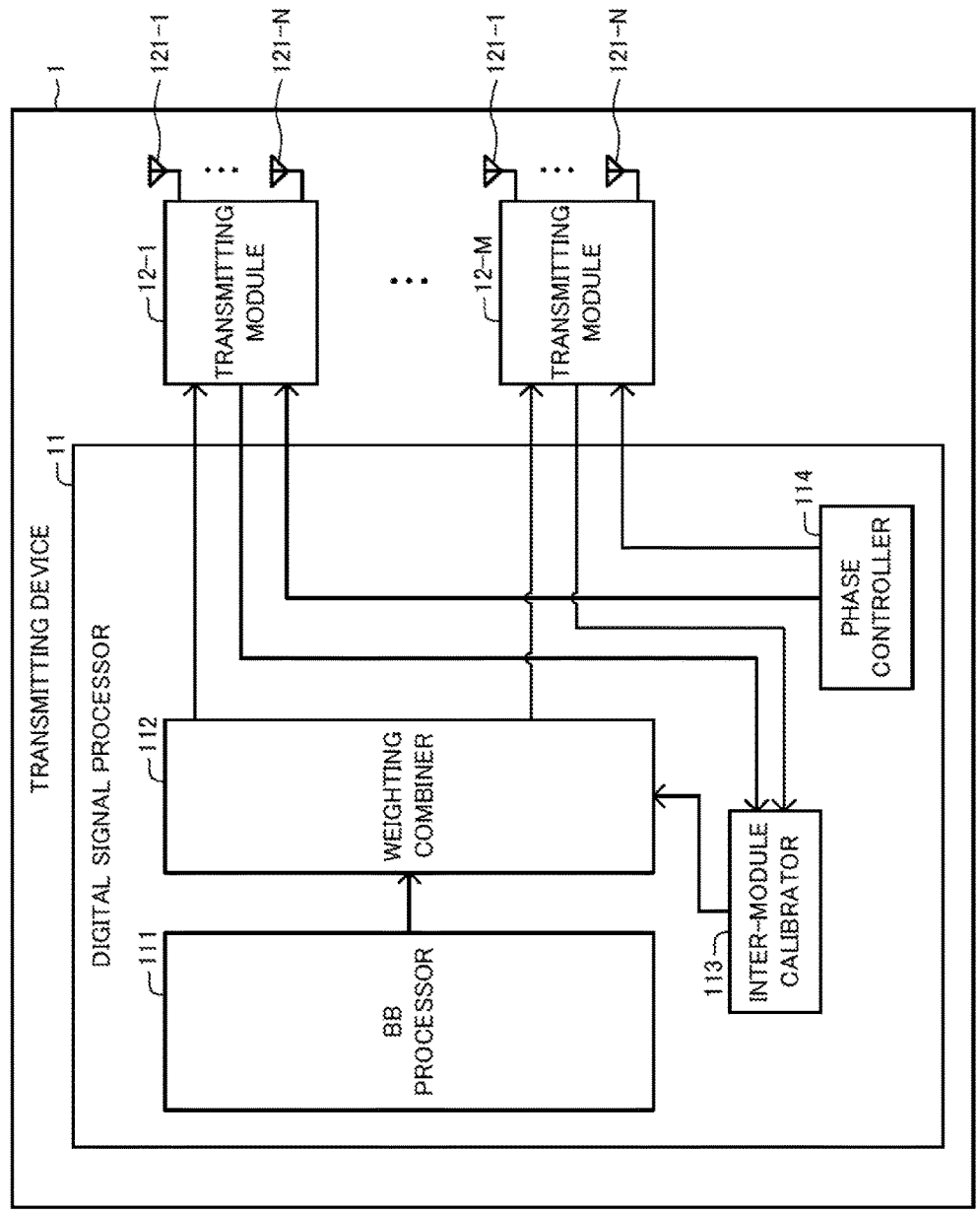
FIG. 6 is a block diagram schematically illustrating another example of the configuration of a transmitting device of the first embodiment.

As illustrated in FIG. 6, the inter-module calibrator 113 may output a signal representing the phase correction amount determined for each transmitting module 12 to the weighting combiner 112 in place of the phase controller 114. In this case, the weighting combiner 112 carries out the weighting and combining process on the basis of the phase correction amount for each transmitting module 12 represented by the signal input from the inter-module calibrator 113. For example, as denoted in Expression 2, the weighting combiner 112 corrects the phase of BB signal to be output to the transmitting module 12-*m* by the phase correction amount $\phi_{\delta,m}$ for the same transmitting module 12-*m* in the weighting and combining process. In Expression 2, the symbol e represents a Napier's constant and the symbol j represents the imaginary unit.

$$x'_m = x_m e^{j\phi_{\delta,m}}$$ [Expression 2]

This allows the digital signal processor 11 that processes a digital signal to achieve the function of controlling a phase, so that the production cost of the transmitting device 1 can be reduced.

Figure 7:
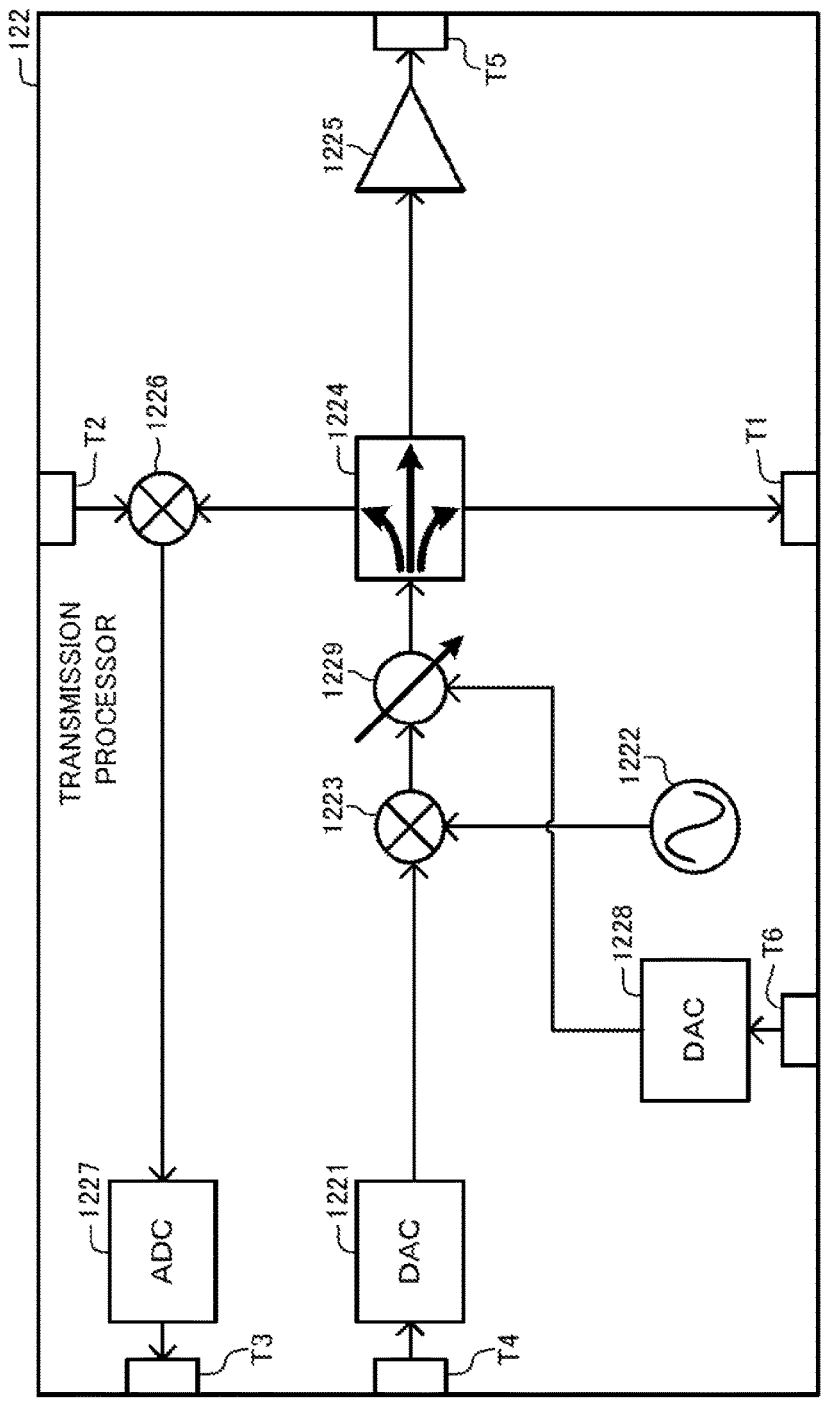
FIG. 7 is a block diagram schematically illustrating another example of the configuration of a transmission processor of the first embodiment.

As illustrated in FIG. 7, the phase shifter 1229 may be disposed between the modulator 1223 and the divider 1224. In this configuration, the phase shifter 1229 modifies the phase of a signal between the modulator 1223 and the divider 1224.

With this configuration, the phase shift by the phase shifter 1229 is reflected in a signal to be input into the comparator 1226. In other words, the transmitting device 1 controls a phase in accordance with a feed-back control method, which makes it possible to precisely calibrate the difference of the phases of the M signals. Accordingly, it is possible to suppress the deviation of the difference of the phases of the above M signals, which deviation is accompanied by the start and the end of the operation of the transmitting device 1. Consequently, the quality of signals wirelessly transmitted can be enhanced.

Figure 8:
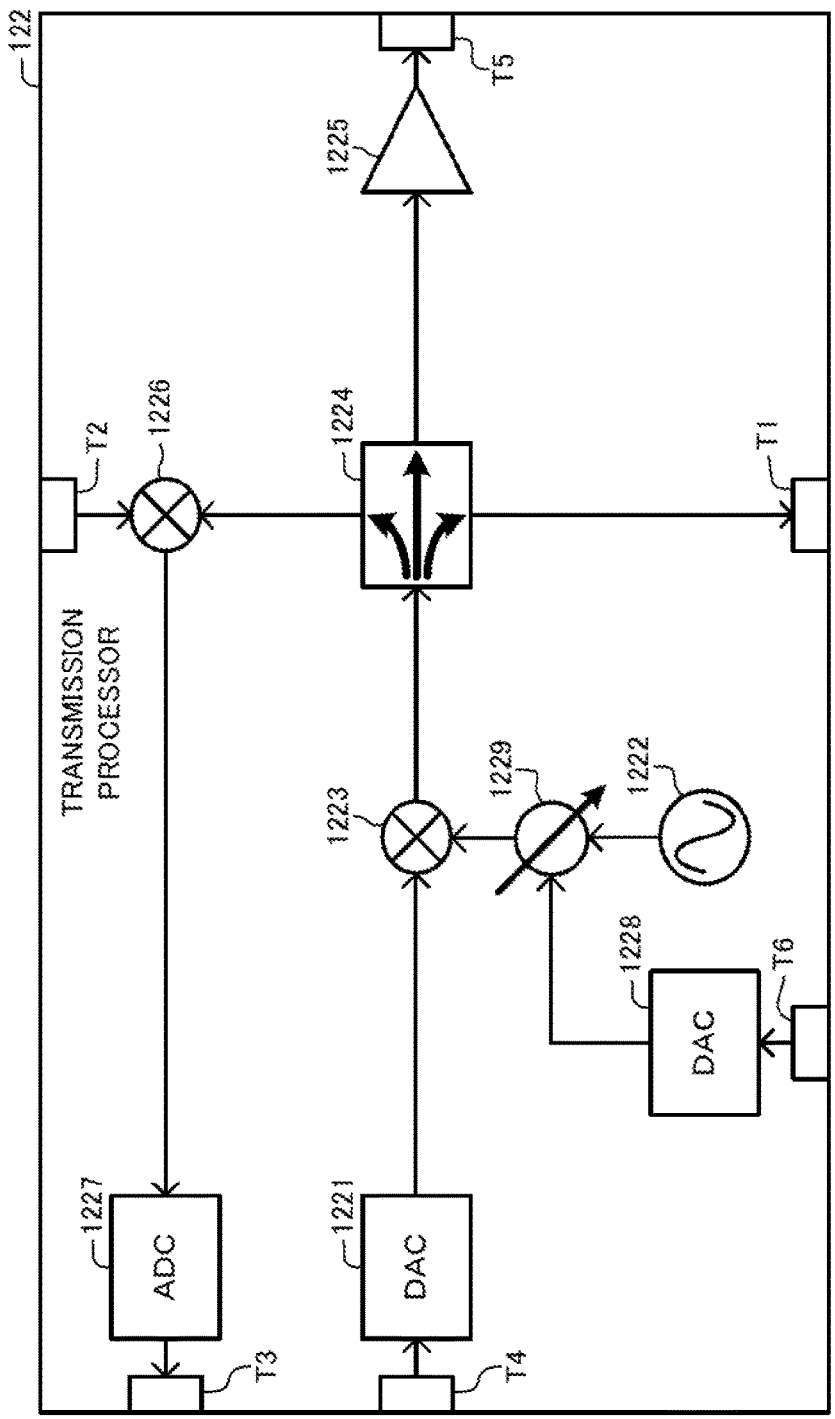
FIG. 8 is a block diagram schematically illustrating another example of the configuration of a transmission processor of the first embodiment.

As illustrated in FIG. 8, the phase shifter 1229 may be disposed between the generator 1222 and the modulator 1223. In this configuration, the phase shifter 1229 shifts the phase of a signal between the generator 1222 and the modulator 1223.

With this configuration, the phase shift by the phase shifter 1229 is reflected in a signal to be input into the comparator 1226. In other words, the transmitting device 1 controls a phase in accordance with a feed-back control method, which makes it possible to precisely calibrate the difference of the phases of the M signals. Accordingly, it is possible to suppress the deviation of the difference of the phases of the above M signals, which deviation is accompanied by the start and the end of the operation of the transmitting device 1. Consequently, it is possible to enhance the quality of signals wirelessly transmitted.

The phase shifter 1229 may be disposed out of the route that connects a circuit (in this example, the digital signal processor 11) that processes a BB signal and the antennas 121-1, ..., and 121-N. This configuration makes it possible to shorten the route as compared with a configuration in which the phase shifter 1229 is disposed on the route and consequently makes it possible to suppress the loss of a signal transmitted through the route. Accordingly, this configuration can suppress degrading a quality of a signal transmitted through the route.

Alternatively, the transmitting device 1 may include a first phase shifter that is used for phase shift in the initial process and a second phase shifter that is used for the non-initial process, in place of the phase shifter 1229. In this case, each of the first phase sifter and the second phase shifter may be disposed between the DAC 1221 and the modulator 1223; between the modulator 1223 and the divider 1224; or between the generator 1222 and the modulator 1223. Also in this case, the first phase shifter or the second phase shifter may be achieved by the weighting combiner 112.

First Modification to the First Embodiment

Description will now be made in relation to a transmitting device according to a first modification to the first embodiment. The transmitting device of the first modification is different from the transmitting device of the first embodiment in the point of performing the non-initial process that controls the phases in accordance with a feed-forward control method. Hereinafter, the description will focus on the difference. Like reference numbers designate the same as or substantially similar elements between the first embodiment and the first modification.

Figure 9:
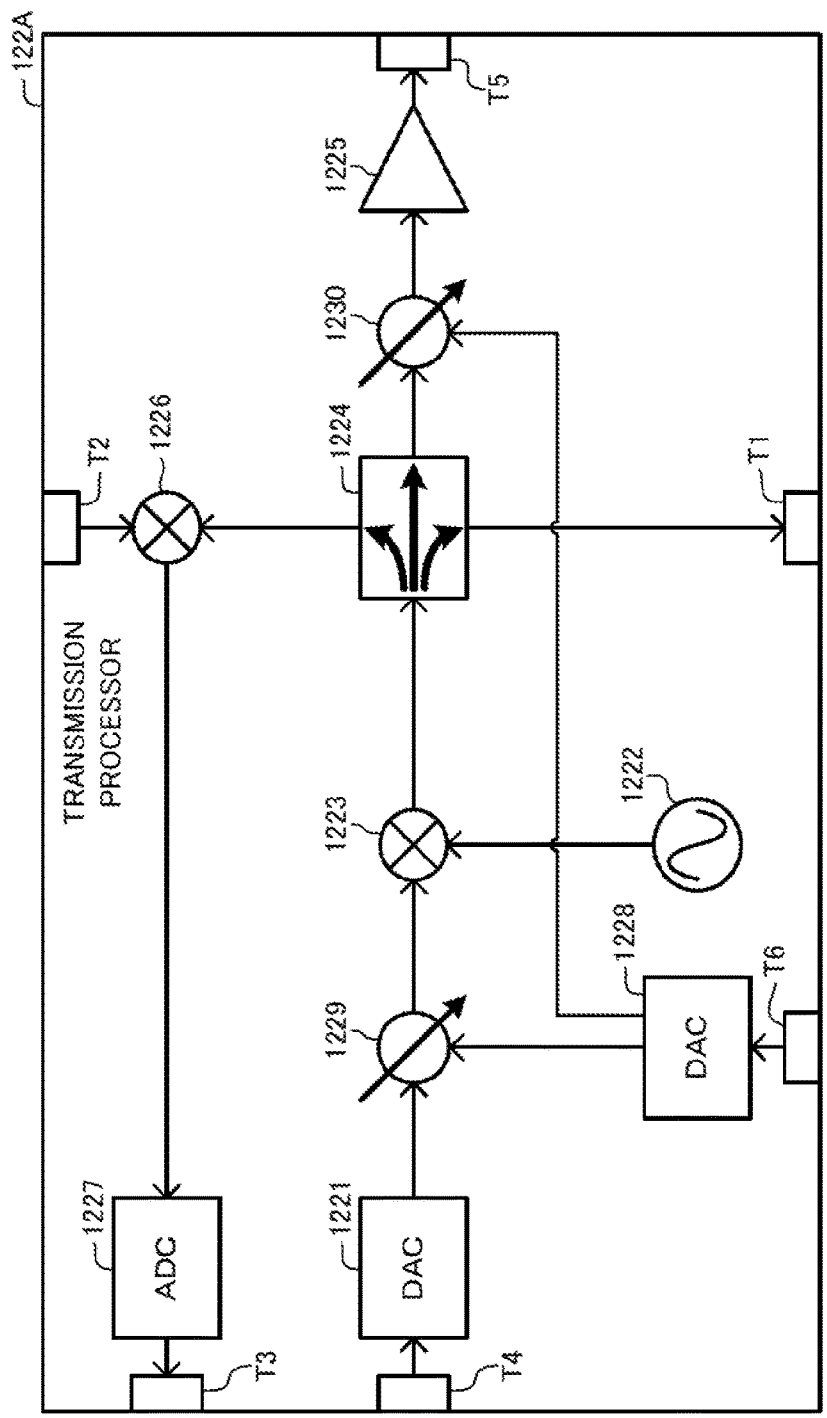
FIG. 9 is a block diagram schematically illustrating an example of the configuration of a transmission processor of a first modification to the first embodiment.

As illustrated in FIG. 9, the transmission processor 122A of the first modification to the first embodiment includes, for example, a phase shifter 1230 in addition to the elements included in the transmission processor 122.

In this example, the DAC 1228 outputs a converted control signal to the phase shifter 1229 or the phase shifter 1230.

The phase shifter 1230 shifts the phase of a signal input from the divider 1224 on the basis of a control signal input from the DAC 1228. The phase shifter 1230 of this example shifts the phase of a signal input from the divider 1224 by the phase shift amount represented by the control signal input from the DAC 1228. The phase shifter 1230 outputs the shifted signal to the amplifier 1225. This means that the phase shifter 1230 of this example shifts a phase of a signal between the divider 1224 and the terminal T5.

In this example, the transmission processor 122A controls a phase using the phase shifter 1229 in the initial process, and controls a phase using the phase shifter 1230 in the non-initial process.

(Operation)

Description will now be made in relation to an example of the operation of the transmitting device 1.

Figure 10:
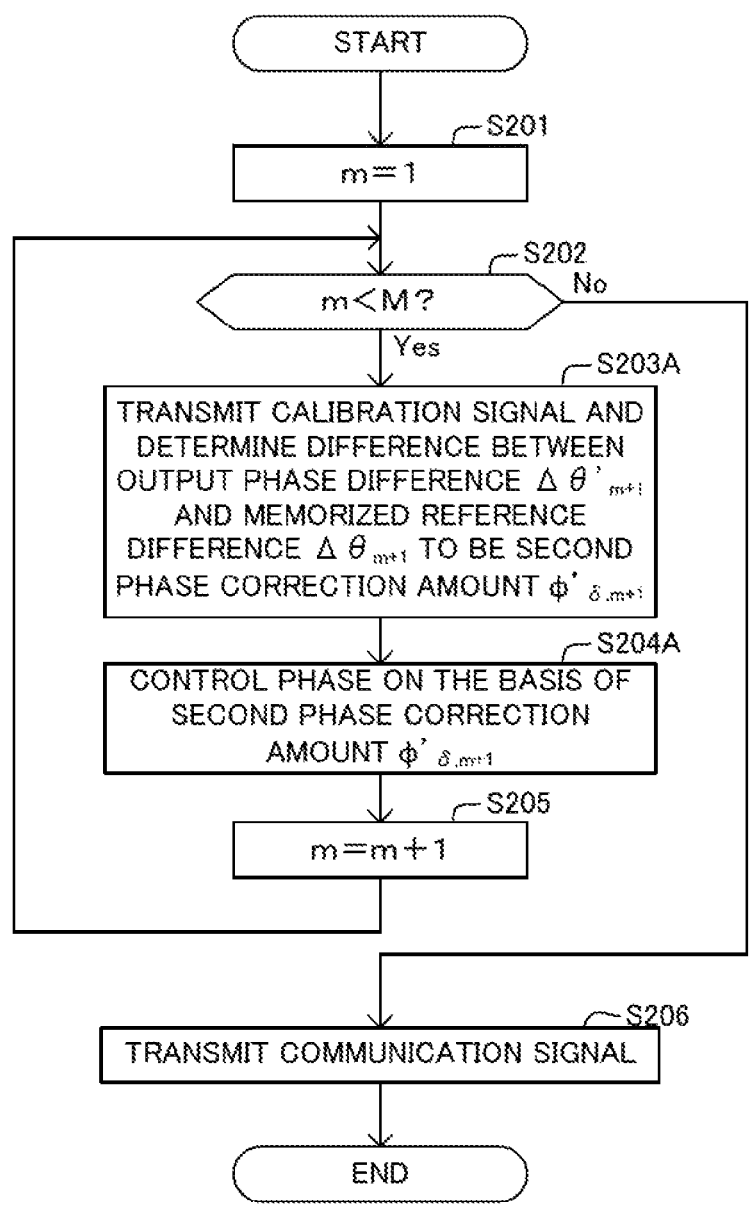
FIG. 10 is a flow diagram denoting an example of a process carried out by a digital signal processor of the first modification to the first embodiment.

The transmitting device 1 of this example operates likewise the transmitting device 1 of the first embodiment except for carrying out the process of FIG. 10 in place of the process of FIG. 5 as the non-initial process.

The process of FIG. 10 is the same process of FIG. 5 except for a point that the steps S203-S204 are replaced with the steps S203A-S204A.

When the process proceeds to step S203A of FIG. 10, the digital signal processor 11 controls the BB processor 111 such that a calibration signal is transmitted. Thereby, the transmitting device 1 transmits a calibration signal from each of the M transmitting modules 12-1, ..., and 12-M. The digital signal processor 11 further obtains the phase difference $\Delta\theta'_{m+1}$ (in other words, output phase difference) represented by a difference signal input from the transmitting module 12-($m$+1).

The digital signal processor 11 determines the difference between the obtained output phase difference $\Delta\theta'_{m+1}$ and the memorized reference difference $\Delta\theta_{m+1}$ to be the phase correction amount $\phi'_{\delta, m+1}$ for the transmitting module 12-($m$+1) (step S203A of FIG. 10). The digital signal processor 11 of this example determines a value $\Delta\theta'_{m+1} - \Delta\theta_{m+1}$ obtained by subtracting the memorized reference difference $\Delta\theta_{m+1}$ from the obtained output phase difference $\Delta\theta'_{m+1}$ to be the phase correction amount $\phi'_{\delta,m+1}$ for the transmitting module 12-($m$+1). The phase correction amount $\phi'_{\delta,m+1}$ may be referred to as a second phase correction amount $\phi'_{\delta,m+1}$. The process of step S203A of FIG. 10 is an example of a phase adjusting process.

The digital signal processor 11 determines the phase shift amount for the transmitting module 12-($m$+1) by adding the determined second phase correction amount $\phi'_{\delta,m+1}$ to the basic shift amount. The digital signal processor 11 outputs a control signal representing the determined phase shift amount to the transmitting module 12-($m$+1). In this example, the phase shifter 1230 of the transmitting module 12-($m$+1) shifts the phase of a signal input from the divider 1224 by the phase shift amount represented by the control signal input from the digital signal processor 11. Thereby, the digital signal processor 11 controls the phase of a signal to be transmitted from the transmitting module 12-($m$+1) (step S204A of FIG. 10).

After that, the digital signal processor 11 carries out a process of step S205 and subsequent to step S205 of FIG. 10.

As described above, the transmitting device 1 of the first modification to the first embodiment provides effects and advantages the same as those of the transmitting device 1 of the first embodiment.

Furthermore, in the transmitting device 1 of the first modification to the first embodiment, the phase shifter 1230 shifts the phase of a signal between the divider 1224 and the output terminal T5.

With this configuration, the phase shift by the phase shifter 1230 is not reflected in a signal input into the comparator 1226. In other words, the transmitting device 1 controls a phase in accordance with a feed-forward control method, so that the phase control can be accomplished rapidly.

Figure 11:
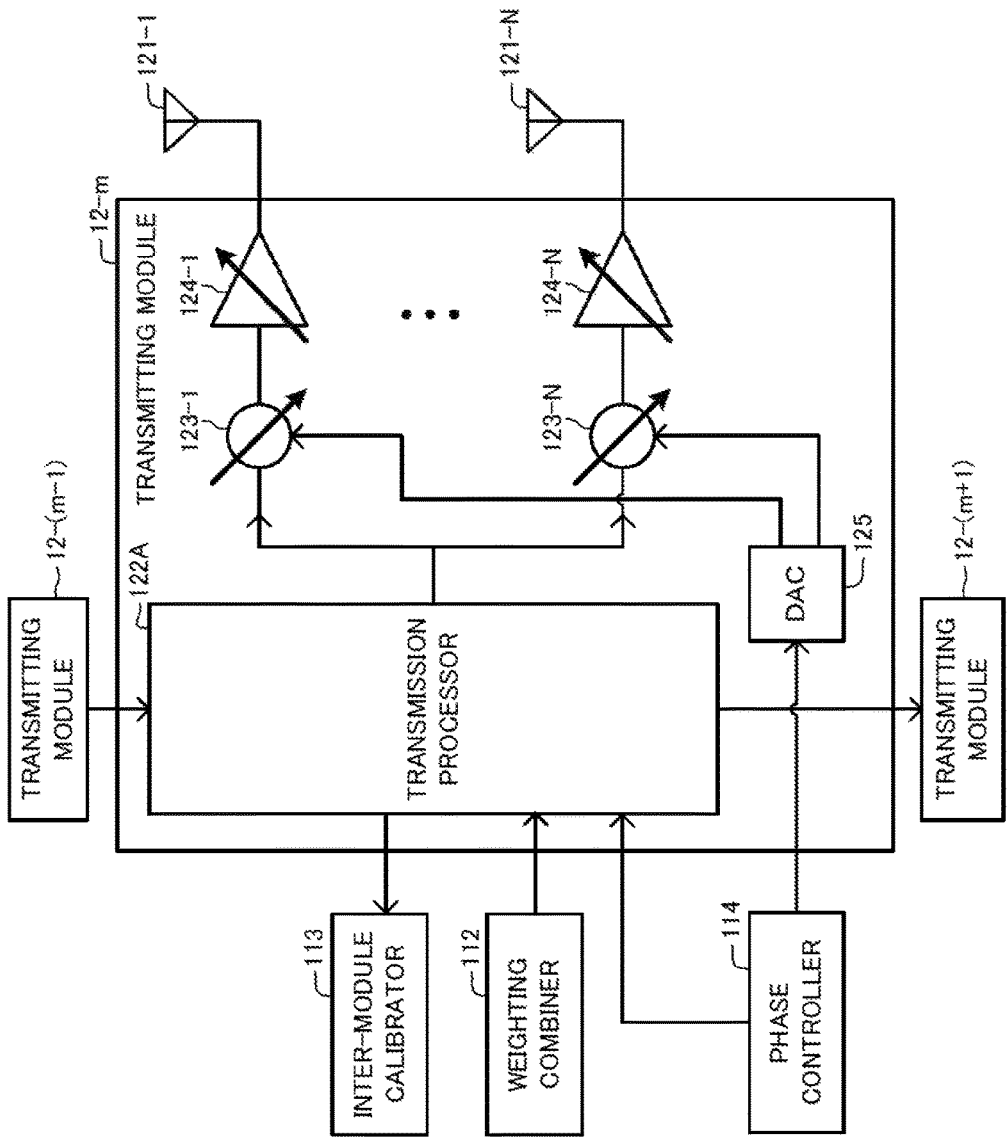
FIG. 11 is a block diagram schematically illustrating another example of the configuration of a transmitting module of the first modification to the first embodiment.

The transmitting device 1 may use N phase shifters 123-1, . . . , and 123-N for controlling a phase in the non-initial process in place of the phase shifter 1230. In this case, as illustrated in FIG. 11, for example, the transmitting module 12-m further includes a DAC 125. With this configuration, the phase controller 114 outputs the control signal representing the phase shift amount determined for each transmitting module 12 to the DAC 125 as well as the transmission processor 122A of the same transmitting module 12.

The DAC 125 converts the control signal input from the phase controller 114 from a digital signal to an analog signal, and outputs the converted control signal to each of the N phase shifters 123-1 to 123-N. Each of the N phase shifters 123-1 to 123-N shifts the phase of a signal input from the transmission processor 122A on the basis of the control signal input from the DAC 125. In this example, each of the N phase shifters 123-1 to 123-N shifts the phase of a signal input from the transmission processor 122A by a phase shift amount represented by the control signal input from the DAC 125.

The phase shifter 1229 may be disposed between the modulator 1223 and the divider 1224 or between the generator 1222 and the modulator 1223. In the transmitting device 1, the weighting combiner 112 may shift the phase in place of the phase shifter 1229.

In the transmitting device 1, the N phase shifters 123-1 to 123-N may shift the phase in place of the phase shifter 1230.

Second Modification to the First Embodiment

Next, description will now be made in relation to a transmitting device according to a second modification to the first embodiment. The transmitting device of the second modification is different from the transmitting device of the first embodiment in the point of performing both the initial process and the non-initial process that control the phases in a feed-forward control method. Hereinafter, the description will focus on the difference. Like reference numbers designate the same as or substantially similar elements between the first embodiment and the second modification.

Figure 12:
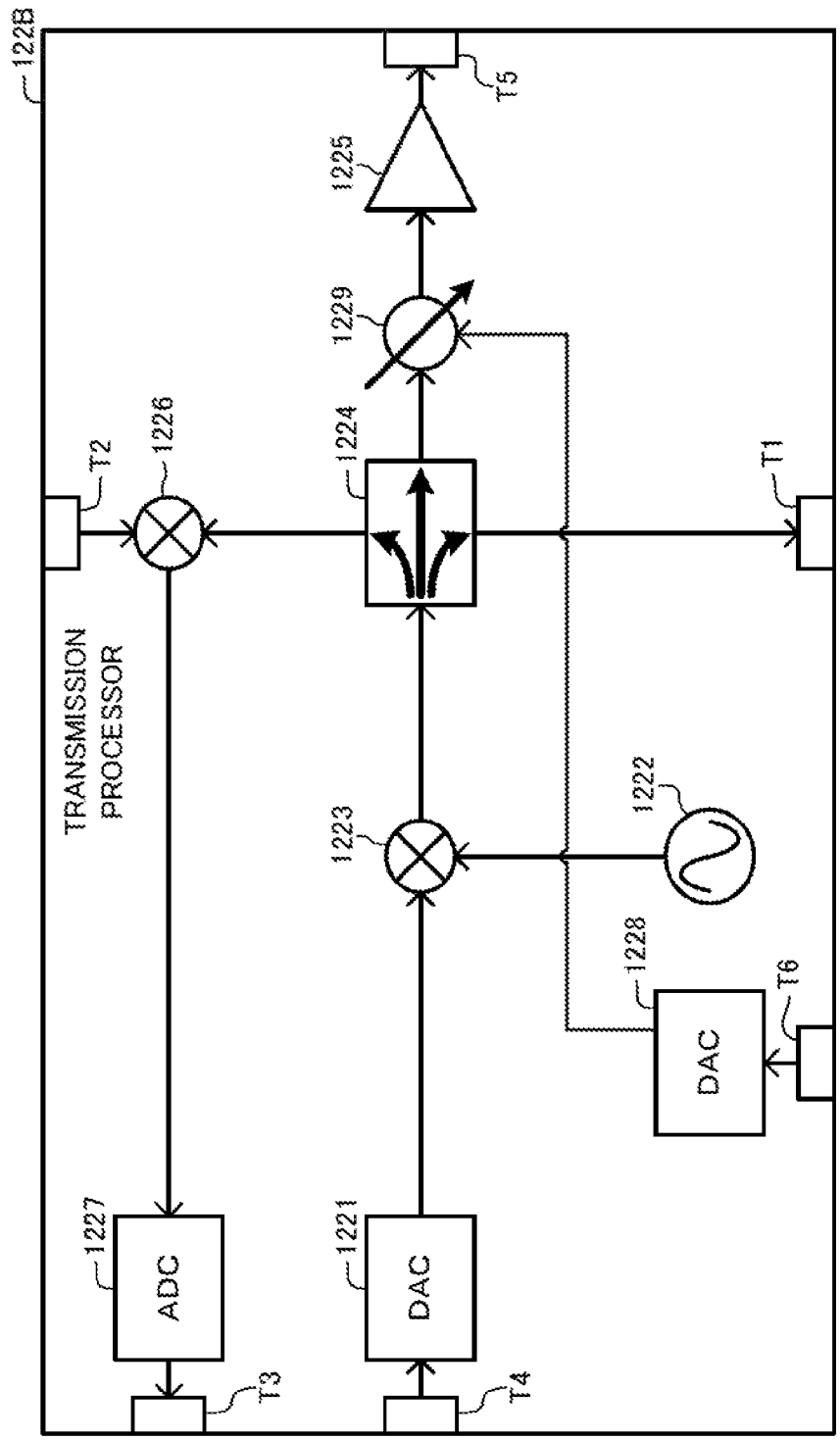
FIG. 12 is a block diagram schematically illustrating an example of the configuration of a transmission processor of a second modification to the first embodiment.

As illustrated in FIG. 12, the phase shifter 1229 of a transmission processor 122B of the second modification to the first embodiment shifts, for example, the phase of a signal input from the divider 1224 on the basis of a control signal input from the DAC 1228. The phase shifter 1229 of this example shifts the phase of a signal input from the divider 1224 by a phase shift amount represented by the control signal input from the DAC 1228, and then outputs the shifted signal to the amplifier 1225. This means that the phase shifter 1229 shifts the phase of a signal between the divider 1224 and the terminal T5.

(Operation)

Description will now be made in relation to an example of the operation of the transmitting device 1.

Figure 13:
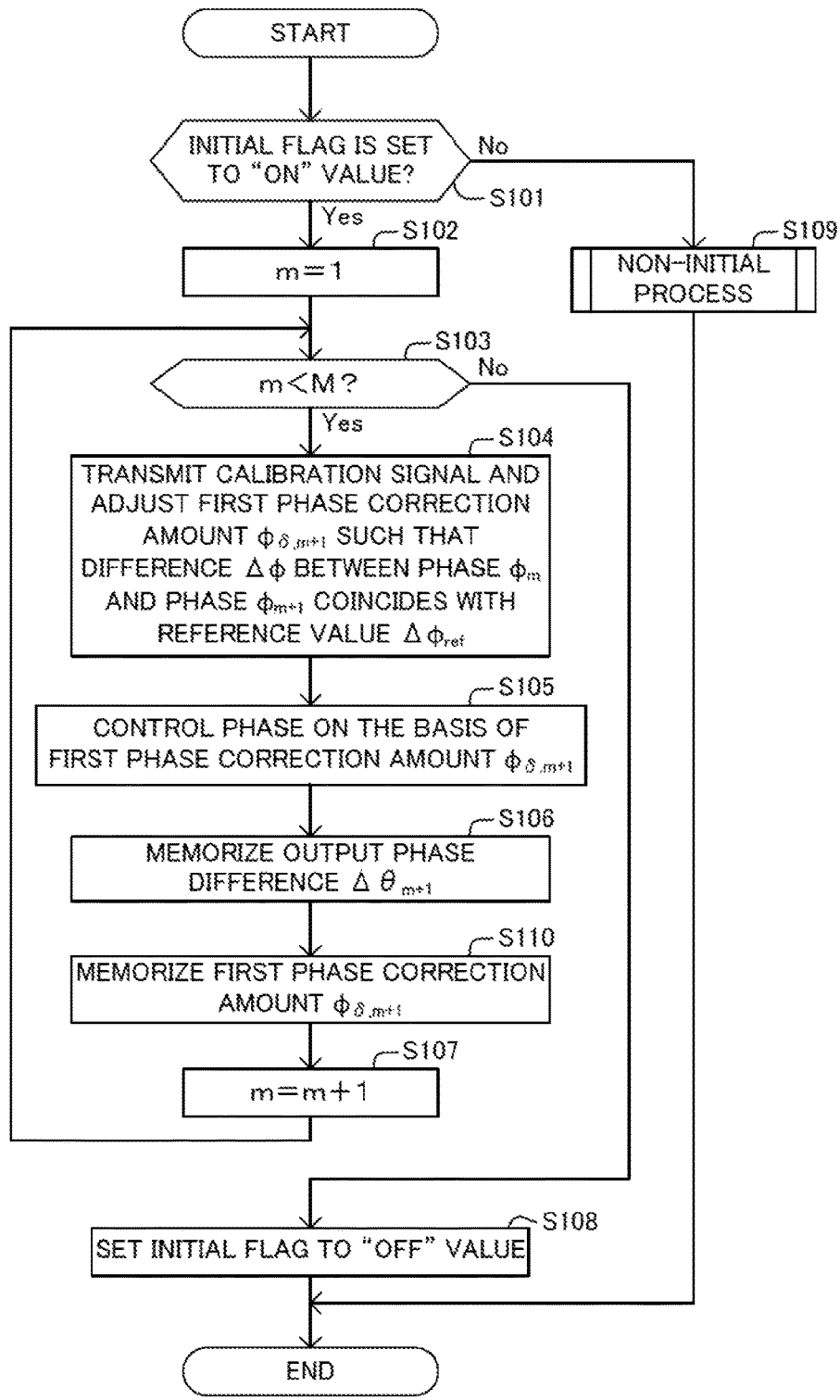
FIG. 13 is a flow diagram denoting an example of a process carried out by a digital signal processor of the second modification to the first embodiment.
Figure 14:
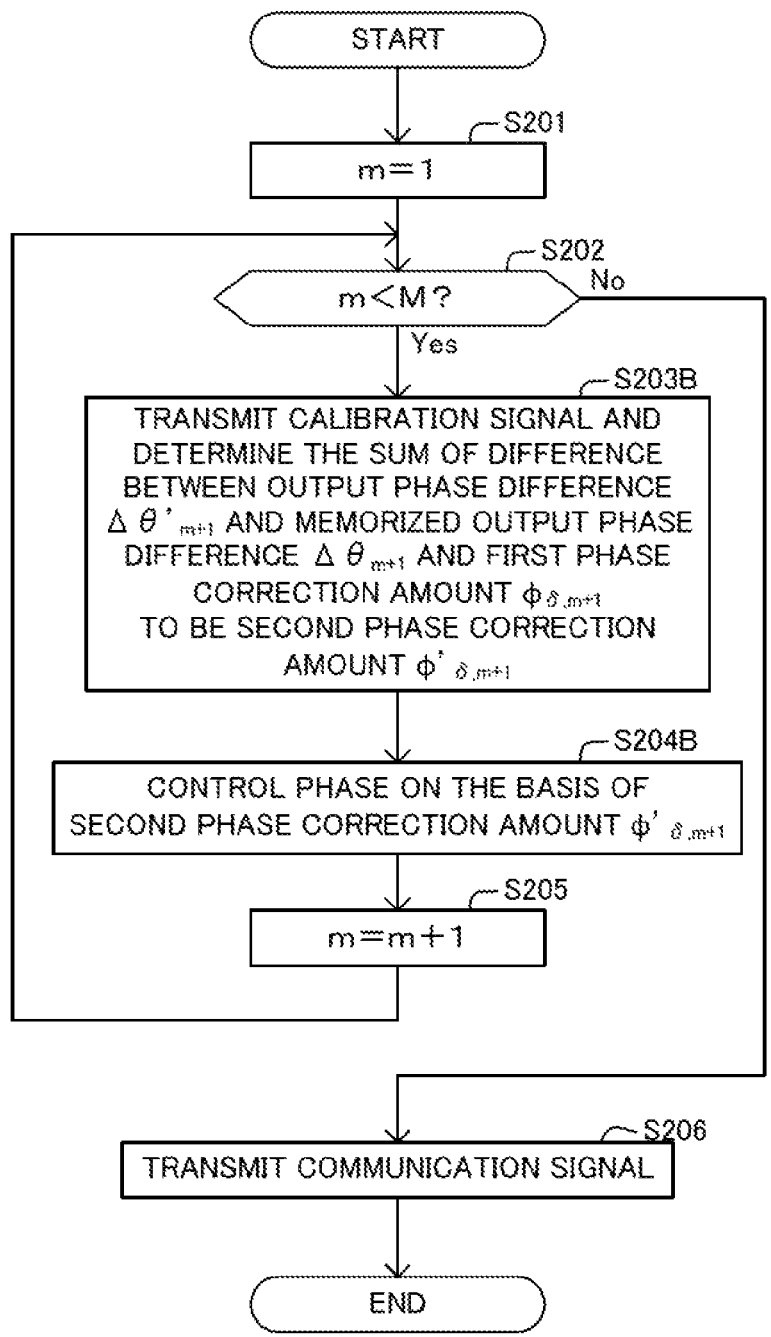
FIG. 14 is a flow diagram denoting an example of a process carried out by a digital signal processor of the second modification to the first embodiment.

The transmitting device 1 of this example operates likewise the transmitting device 1 of the first embodiment except for performing the process of FIG. 13 in place of the process of FIG. 4 and the process of FIG. 14 in place of the process of FIG. 5.

The process of FIG. 13 is the same process of FIG. 4 except for additionally including step S110 between the steps S106 and S107.

The process of FIG. 14 is the same process of FIG. 5 except for a point in which steps S203-S204 are replaced with steps S203B-S204B.

After carrying out the process of step S106 of FIG. 13, the digital signal processor 11 memorizes the first phase correction amount $\phi_{\delta,m+1}$ adjusted in step S104 into a non-volatile memory (step S110 of FIG. 13).

After that, the digital signal processor 11 carries out a process of step S107 and subsequent to step S107 of FIG. 13.

When the process proceeds to step S203B of FIG. 14, the digital signal processor 11 controls the BB processor 111 such that a calibration signal is transmitted. Thereby, the transmitting device 1 transmits a calibration signal from each of the M transmitting modules 12-1, . . . , and 12-M. The digital signal processor 11 further obtains the phase difference $\Delta\theta'_{m+1}$ (in other words, output phase difference) represented by a difference signal input from the transmitting module 12-(m+1).

The digital signal processor 11 determines the sum of the first phase correction amount $\phi_{\delta,m+1}$ and the difference between the obtained output phase difference $\Delta\theta'_{m+1}$ and the reference difference $\Delta\theta_{m+1}$ to be the phase correction amount $\phi'_{\delta,m+1}$ for the transmitting module 12-(m+1) (step S203B of FIG. 14). The digital signal processor 11 of this example determines the sum of the first phase correction amount $\phi_{\delta,m+1}$ and a value $\Delta\theta'_{m+1}-\Delta\theta_{m+1}$ obtained by subtracting the memorized reference difference $\Delta\theta_{m+1}$ from the obtained output phase difference $\Delta\theta'_{m+1}$ to be the phase correction amount $\phi'_{\delta,m+1}$. The phase correction amount $\phi'_{\delta,m+1}$ may be referred to as a second phase correction amount $\phi'_{\delta,m+1}$. The process of step S203B of FIG. 14 is an example of a phase adjusting process.

The digital signal processor 11 determines the phase shift amount for the transmitting module 12-(m+1) by adding the determined second phase correction amount $\phi'_{\delta,m+1}$ to the basic shift amount. The digital signal processor 11 outputs a control signal representing the determined phase shift amount to the transmitting module 12-(m+1). In this example, the phase shifter 1229 of the transmitting module 12-(m+1) shifts the phase of a signal input from the divider 1224 by the phase shift amount represented by the control signal input from the digital signal processor 11. Thereby, the digital signal processor 11 controls the phase of a signal to be transmitted from the transmitting module 12-(m+1) (step S204B of FIG. 14).

After that, the digital signal processor 11 carries out a process of step S205 and subsequent to step S205 of FIG. 14.

As described above, the transmitting device 1 of the second modification to the first embodiment provides effects and advantages the same as those of the transmitting device 1 of the first embodiment.

Furthermore, in the transmitting device 1 of the second modification to the first embodiment, the phase shifter 1229 shifts the phase of a signal between the divider 1224 and the output terminal T5.

With this configuration, the phase shift by the phase shifter 1229 is not reflected in a signal input into the comparator 1226. In other words, the transmitting device 1 controls a phase in accordance with a feed-forward control method, so that phase control can be accomplished rapidly.

Figure 15:
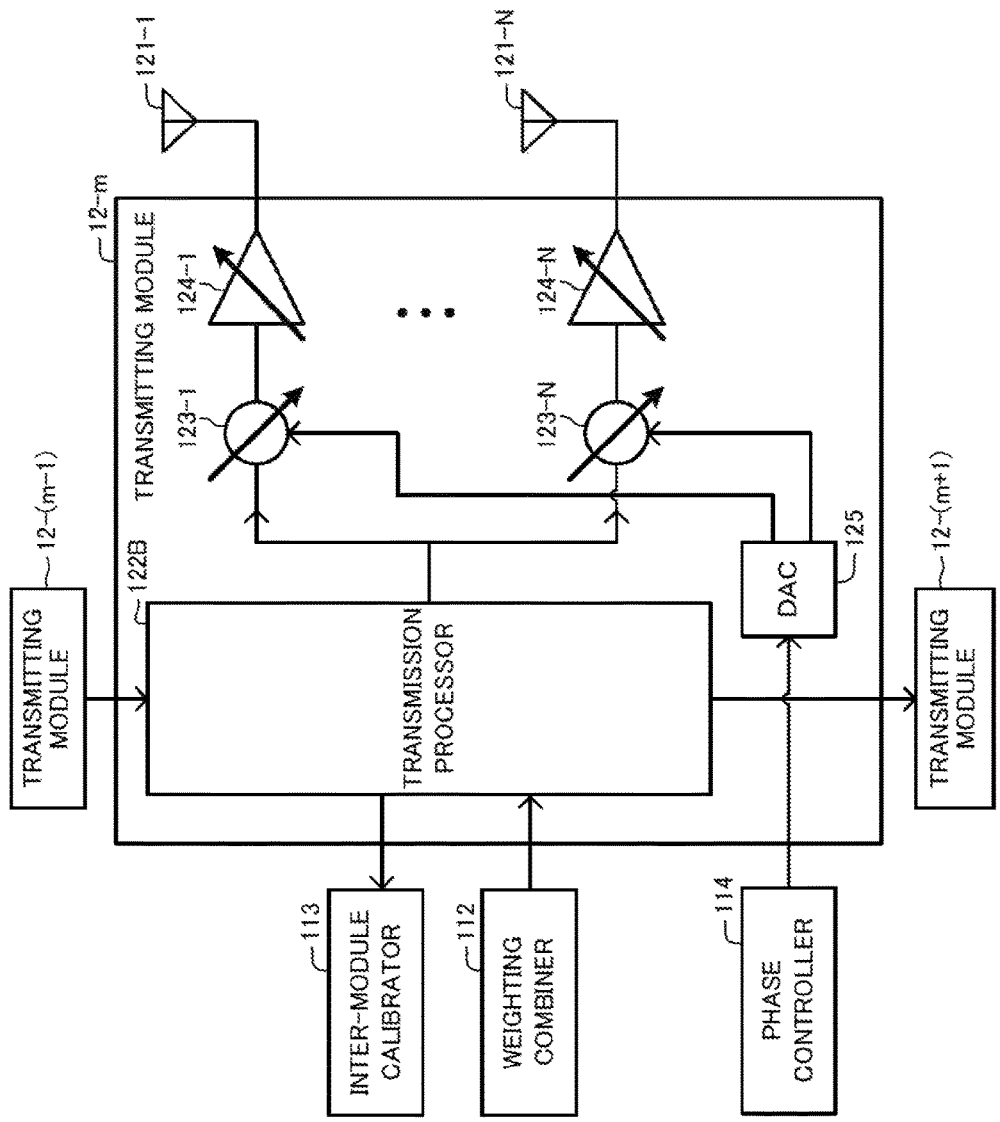
FIG. 15 is a block diagram schematically illustrating another example of the configuration of a transmitting module of the second modification to the first embodiment.

The transmitting device 1 may use N phase shifters 123-1, ..., and 123-N for controlling a phase in place of the phase shifter 1229. In this case, as illustrated in FIG. 15, for example, the transmitting module 12-$m$ further includes a DAC 125. With this configuration, the phase controller 114 outputs the control signal representing the phase shift amount determined for each transmitting module 12 to the DAC 125 in place of the transmission processor 122B of the same transmitting module 12.

The DAC 125 converts the control signal input from the phase controller 114 from a digital signal to an analog signal, and outputs the converted control signal to each of the N phase shifters 123-1 to 123-N. Each of the N phase shifters 123-1 to 123-N converts the phase of a signal input from the transmission processor 122B on the basis of the control signal input from the DAC 125. In this example, each of the N phase shifters 123-1 to 123-N converts the phase of a signal input from the transmission processor 122B by a phase shift amount represented by the control signal input from the DAC 125.

In the transmitting device 1, the N phase shifters 123-1 to 123-N may shift the phase in place of the phase shifter 1229.

Alternatively, the transmitting device 1 may include a first phase shifter that is used for phase shift in the initial process and a second phase shifter that is used for the non-initial process, in place of the phase shifter 1229. In this case, each of the first phase sifter and the second phase shifter may be disposed between the divider 1224 and the amplifier 1225. Also in this case, the first phase shifter or the second phase shifter may be achieved by N phase shifters 123-1, ..., and 123-N.

Third Modification to First Embodiment

Description will now be made in relation to a transmitting device according to a third modification to the first embodiment. The transmitting device of the third modification is different from the transmitting device of the second modification to the first embodiment in the point of carrying out the non-initial process that controls the phases in a feed-back control method. Hereinafter, the description will focus on the difference. Like reference numbers designate the same as or substantially similar elements between the second modification to the first embodiment and the third modification.

Figure 16:
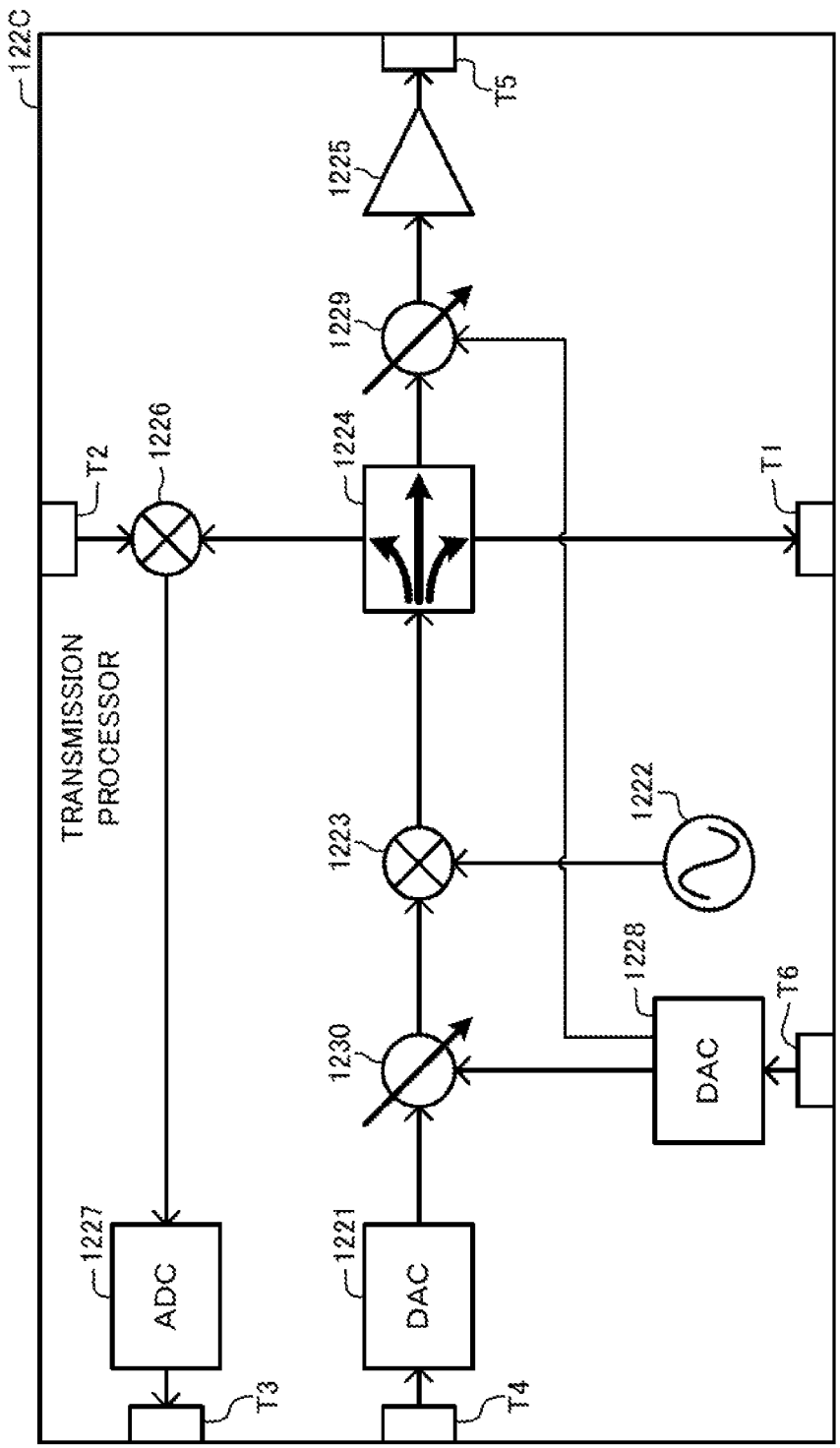
FIG. 16 is a block diagram schematically illustrating an example of the configuration of a transmission processor of a third modification to the first embodiment.

As illustrated in FIG. 16, the transmission processor 122C of the third modification to the first embodiment includes, for example, the phase shifter 1230 in addition to the elements included in the transmission processor 122B.

In this example, the DAC 1228 outputs the converted control signal to the phase shifter 1229 or the phase shifter 1230.

The phase shifter 1230 shifts the phase of a signal input from the DAC 1221 on the basis of the control signal input from the DAC 1228. The phase shifter 1230 of this example shifts the phase of a signal input from the DAC 1221 by the phase shift amount represented by the control signal input from the DAC 1228. The phase shifter 1230 outputs the shifted signal to the modulator 1223. This means that the phase shifter 1230 of this example shifts a phase of a signal between the modulator 1223 and the terminal T4.

In this example, the transmission processor 122C controls a phase using the phase shifter 1229 in the initial process and controls a phase using the phase shifter 1230 in the non-initial process.

(Operation)
Description will now be made in relation to an example of the operation of the transmitting device 1.

Figure 17:
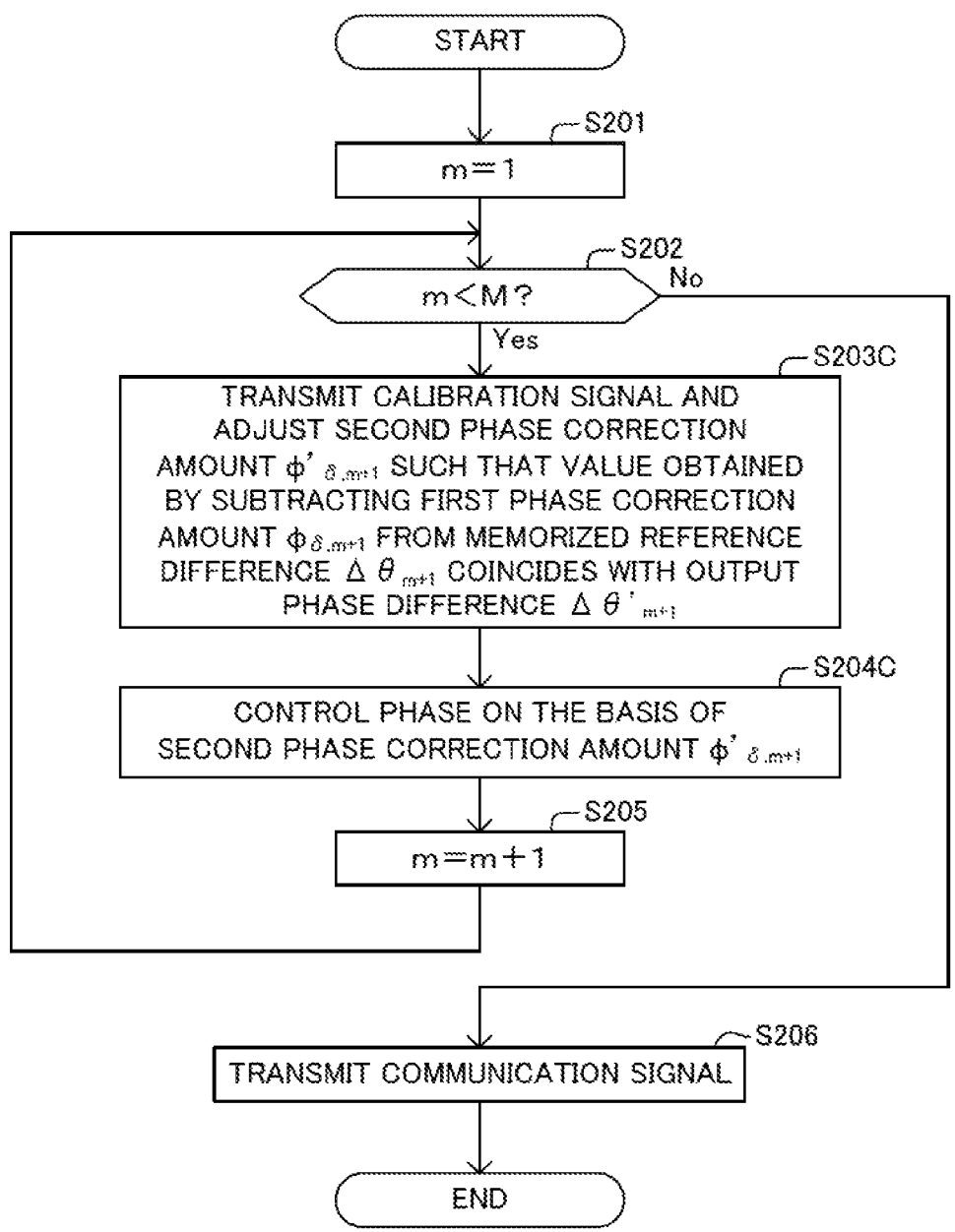
FIG. 17 is a flow diagram denoting an example of a process carried out by a digital signal processor of the third modification to the first embodiment.

The transmitting device 1 of this example operates likewise the transmitting device 1 of the second modification to the first embodiment except for carrying out the process of FIG. 17 as the non-initial process in place of the process of FIG. 14.

The process of FIG. 17 is the same process of FIG. 14 except for a point in which steps S203B-S204B are replaced with steps S203C-S204C.

When the process proceeds to step S203C of FIG. 17, the digital signal processor 11 controls the BB processor 111 such that a calibration signal is transmitted. Thereby, the transmitting device 1 transmits a calibration signal from each of the M transmitting modules 12-1, ..., and 12-M. The digital signal processor 11 further obtains the phase difference $\Delta\theta'_{m+1}$ (in other words, output phase difference) represented by a difference signal input from the transmitting module 12-($m$+1).

The digital signal processor 11 adjusts the phase correction amount $\phi'_{\delta,m+1}$ for the transmitting module 12-($m$+1) such that the obtained output phase difference $\Delta\theta'_{m+1}$ coincides with the value obtained by subtracting the first phase correction amount $\phi_{\delta,m+1}$ from the reference difference $\Delta\theta_{m+1}$ (step S203C of FIG. 17). The phase correction amount $\phi'_{\delta,m+1}$ may be referred to as a second phase correction amount $\phi'_{\delta,m+1}$. The process of step S203C of FIG. 17 is an example of a phase adjusting process.

The digital signal processor 11 determines the phase shift amount for the transmitting module 12-($m$+1) by adding the adjusted second phase correction amount $\phi'_{\delta,m+1}$ to the basic shift amount. The digital signal processor 11 outputs a control signal representing the determined phase shift amount to the transmitting module 12-($m$+1).

In this example, the phase shifter 1230 of the transmitting module 12-($m$+1) shifts the phase of a signal input from the DAC 1221 by the phase shift amount represented by the control signal input from the digital signal processor 11. Thereby, the digital signal processor 11 controls the phase of a signal to be transmitted from the transmitting module 12-($m$+1) (step S204C of FIG. 17).

After that, the digital signal processor 11 carries out a process of step S205 and subsequent to step S205 of FIG. 17.

As described above, the transmitting device 1 of the third modification to the first embodiment provides effects and advantages the same as those of the transmitting device 1 of the second modification to the first embodiment.

In the transmitting device 1 of the third modification to the first embodiment, the phase shifter 1230 shifts the phase of a signal between the input terminal T4 and the modulator 1223.

The phase shift by the phase shifter 1230 is reflected in a signal input into the comparator 1226. In other words, the transmitting device 1 controls a phase in accordance with a feed-back control method, so that the difference of the phases of the M signals can be precisely calibrated. Accordingly, it is possible to suppress the deviation of the difference of the phases of the above M signals, which deviation is accompanied by the start and the end of the operation of the transmitting device 1. Consequently, it is possible to enhance the quality of signals wirelessly transmitted.

The phase shifter 1230 may be disposed between the modulator 1223 and the divider 1224 or between the generator 1222 and the modulator 1230. In the transmitting device 1, the weighting combiner 112 may shift the phase in place of the phase shifter 1230.

In the transmitting device 1, the N phase shifters 123-1 to 123-N may shift the phase in place of the phase shifter 1229.

Fourth Modification to First Embodiment

Next, description will now be made in relation to a transmitting device according to a fourth modification to the first embodiment. The transmitting device of the fourth modification is different from the transmitting device of the first embodiment in the point of carrying out multiple phase adjusting processes in parallel. Hereinafter, the description will focus on the difference. Like reference numbers designate the same as or substantially similar elements between the first embodiment and the fourth modification.

Figure 18:
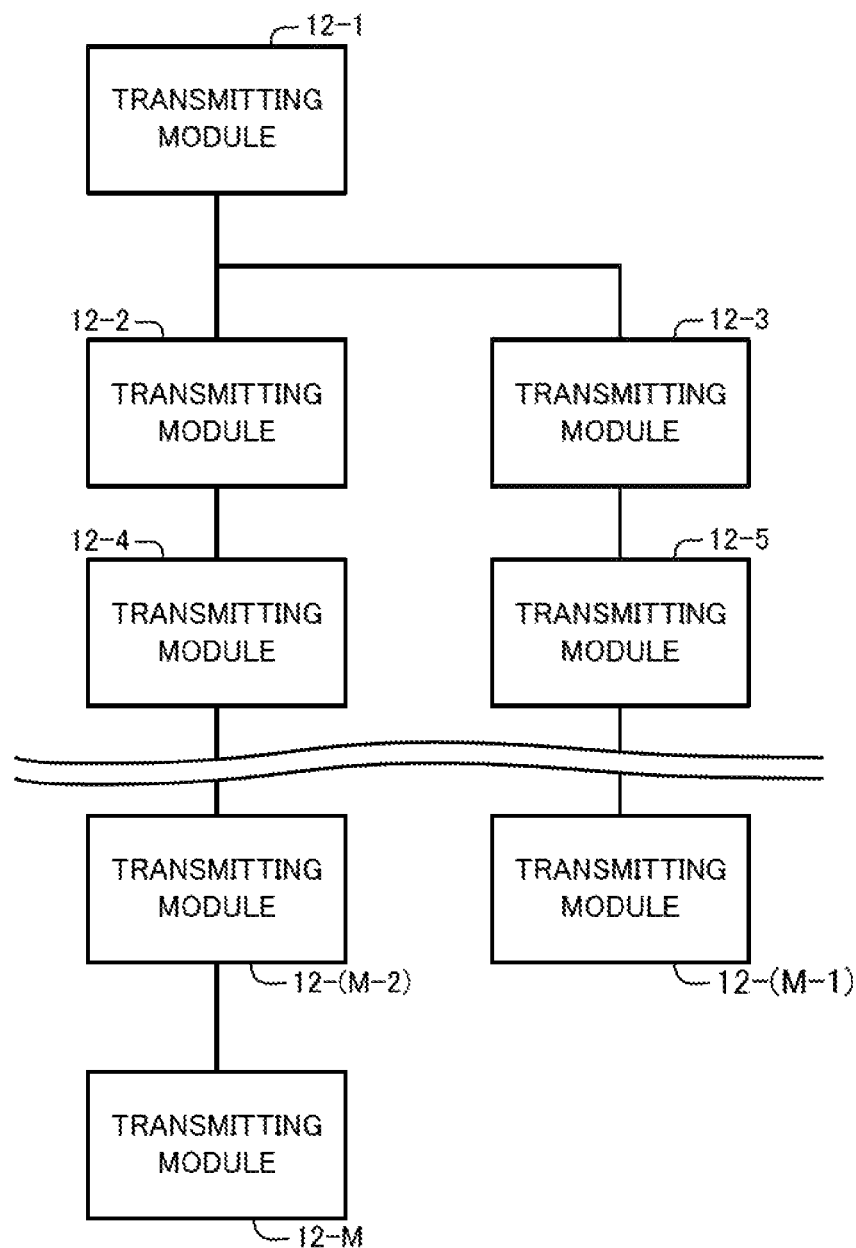
FIG. 18 is a diagram illustrating an example of connection between transmitting modules of a fourth modification to the first embodiment.

As illustrated in FIG. 18, in the transmitting device 1 of the fourth modification to the first embodiment, for example, the number M of the transmitting modules 12 is an even number of four or more. Alternatively, the number M of the transmitting modules 12 may be an odd number.

The terminal T1 of the transmitting module 12-1 is coupled to the terminal T2 of the transmitting module 12-2 and also to the terminal T2 of the transmitting module 12-3. The terminal T1 of the transmitting module 12-$m$ (where m represents an integer of two or more) is coupled to the terminal T2 of the transmitting module 12-($m$+2).

In this example, the digital signal processor 11 carries out M–2 phase adjusting processes in parallel. In this example, the digital signal processor 11 selects the wireless module 12 having been selected as a reference module or a comparative module for a previous phase adjusting process as the reference module for a current phase adjusting process.

In this example, the digital signal processor first selects transmitting module 12-1 as the reference module and selects the transmitting module 12-2 as the comparative module to execute the phase adjusting process.

Next, the digital signal processor 11 carries out the phase adjusting process on an aggregation of the transmitting modules 12-$m$, where m represents odd numbers in parallel with the phase adjusting process on an aggregation of the transmitting modules 12-$m$, where m represents even numbers. The function of the digital signal processor 11 will be additionally detailed in the following description of the operation of the transmitting device 1.

(Operation)

Description will now be made in relation to an example of the operation of the transmitting device 1.

The transmitting device 1 of this example operates likewise the transmitting device 1 of the first embodiment except for carrying out the processes denoted in FIGS. 19-24 in place of the processes of FIGS. 4 and 5.

Figure 19:
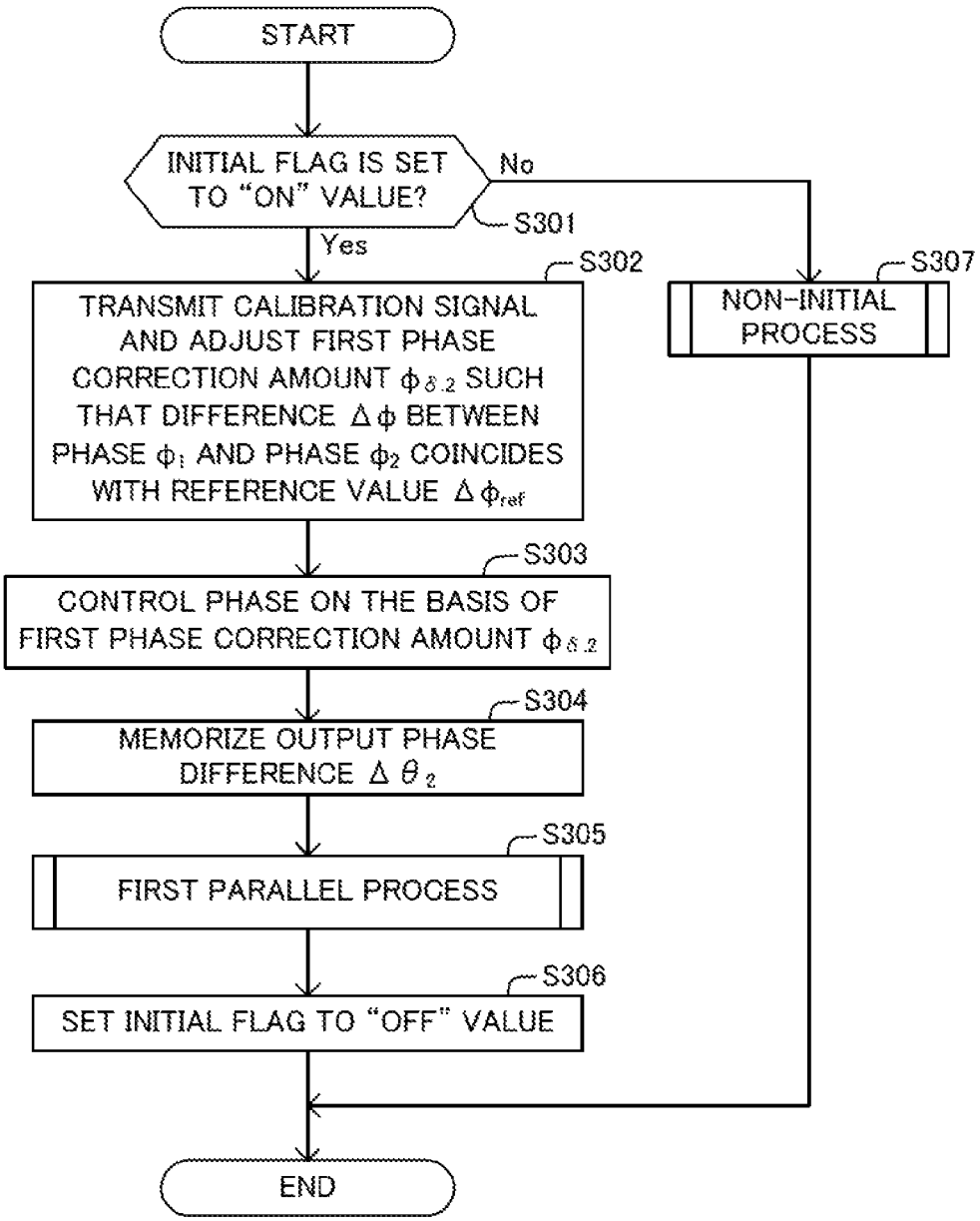
FIG. 19 is a flow diagram denoting an example of a process carried out by a digital signal processor of the fourth modification to the first embodiment.

When the transmitting device 1 starts its operation, the digital signal processor 11 carries out the process of FIG. 19.

First of all, the description will now be made on the assumption that the digital signal processor 11 carries out phase control for the first time (in this example, the transmitting device 1 operates for the first time).

The digital signal processor 11 determines whether the initial flag is set to the "on" value (step S301 of FIG. 19). At this time, since the initial flag is set to the "on" value, the digital signal processor 11 determines "Yes" and controls the BB processor 111 such that a calibration signal is transmitted. Thereby, the transmitting device 1 transmits a calibration signal from each of the M transmitting modules 12-1, . . . , and 12-M.

The digital signal processor 11 adjusts the phase correction amount $\phi_{\delta,2}$ for the transmitting module 12-2 such that the signal phase difference $\Delta\phi$ coincides with a predetermined reference value $\Delta\phi_{ref}$ (e.g., 0°) (step S302 of FIG. 19). The signal phase difference $\Delta\phi$ of step S302 is the difference between the phase $\phi_1$ of the calibration signal transmitted from the transmitting module 12-1 and the phase $\phi_2$ of the calibration signal transmitted from the transmitting module 12-2. The phase correction amount $\phi_{\delta,2}$ may be referred to as a first phase correction amount $\phi_{\delta,2}$.

The digital signal processor 11 determines the phase shift amount for the transmitting module 12-2 by adding the adjusted first phase correction amount $\phi_{\delta,2}$ to the basic shift amount. Then the digital signal processor 11 outputs a control signal representing the determined phase shift amount to the transmitting module 12-2.

In this example, the phase shifter 1229 of the transmitting module 12-2 shifts the phase of a signal input from the DAC 1221 by the phase shift amount represented by the control signal input from the digital signal processor 11. Consequently, the digital signal processor 11 controls the phase of a signal to be transmitted from the transmitting module 12-2 (step S303 of FIG. 19).

Next, the digital signal processor 11 obtains the phase difference (in other words, output phase difference) $\Delta\theta_2$ represented by a difference signal input from the transmitting module 12-2 and memorizes the obtained output phase difference $\Delta\theta_2$ as the reference difference into the non-volatile memory (step S304 of FIG. 19).

After that, the digital signal processor 11 carries out a first parallel process (step S305 of FIG. 19). Specifically, the digital signal processor 11 of this example carries out, as the first parallel process, the process denoted in FIG. 20 in parallel with the process denoted in FIG. 21.

First, description will now be made in relation to the process denoted in FIG. 20.

Figure 20:
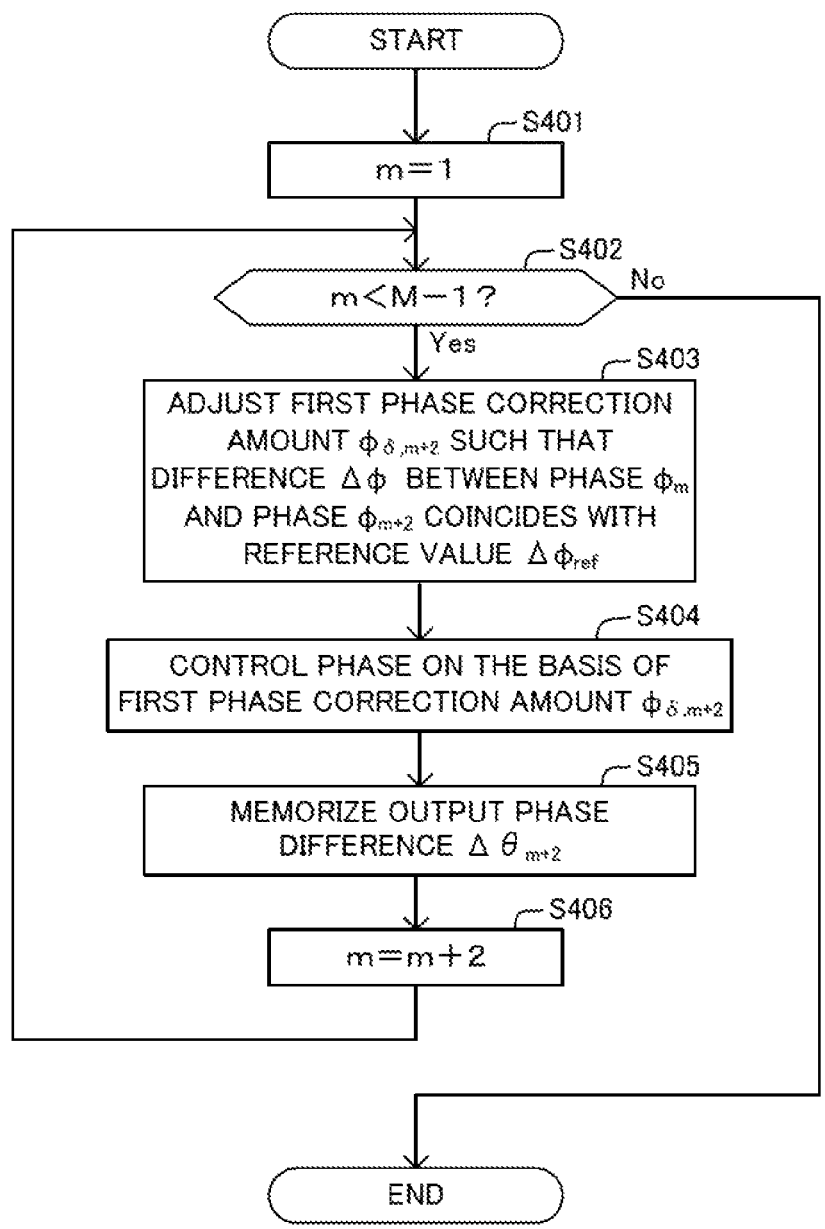
FIG. 20 is a flow diagram denoting an example of a process carried out by a digital signal processor of the fourth modification to the first embodiment.

The digital signal processor 11 sets the loop counter m to one (step S401 of FIG. 20). Next, the digital signal processor 11 determines whether the loop counter m is smaller than a value M–1 obtained by subtracting one from the number M of the transmitting modules 12 (step S402 of FIG. 20). At this time, since the loop counter m is smaller than a value M–1 obtained by subtracting one from the number M of the transmitting modules 12, the digital signal processor 11 determines "Yes".

The digital signal processor 11 adjusts the phase correction amount $\phi_{\delta,m+2}$ for the transmitting module 12-($m$+1) such that the signal phase difference $\Delta\phi$ coincides with the reference value $\Delta\phi_{ref}$ (step S403 of FIG. 20). The signal phase difference $\Delta\phi$ of step S403 is the difference between the phase $\phi_m$ of the calibration signal transmitted from the transmitting module 12-$m$ and the phase $\phi_{m+2}$ of the calibration signal transmitted from the transmitting module 12-($m$+2). The phase correction amount $\phi_{\delta,m+2}$ may be referred to as a first phase correction amount $\phi_{\delta,m+2}$.

The digital signal processor 11 determines the phase shift amount for the transmitting module 12-($m$+2) by adding the adjusted first phase correction amount $\phi_{\delta,m+2}$ to the basic shift amount and then outputs a control signal representing the determined phase shift amount to the transmitting module 12-($m$+2).

In this example, the phase shifter 1229 of the transmitting module 12-($m$+2) shifts the phase of a signal input from the DAC 1221 by the phase shift amount represented by the control signal input from the digital signal processor 11. Thereby, the digital signal processor 11 controls the phase of a signal to be transmitted from the transmitting module 12-($m$+2) (step S404 of FIG. 20).

Next, the digital signal processor 11 obtains the phase difference (in other words, output phase difference) $\Delta\theta_{m+2}$ represented by the difference signal input from the transmitting module 12-($m$+2), and memorizes the obtained output phase difference $\Delta\theta_{m+2}$ as a reference difference into a non-volatile memory (step S405 of FIG. 20).

The digital signal processor 11 adds two to the loop counter m (step S406 of FIG. 20), and then returns to step S402 to repeat the process of steps S402 to S406.

After that, when the loop counter m reaches the value equal to or more than M−1 obtained by subtracting one from the number M of the transmitting modules 12, the digital signal processor 11 determines "No" in step S402 and finishes the process of FIG. 20.

Figure 21:
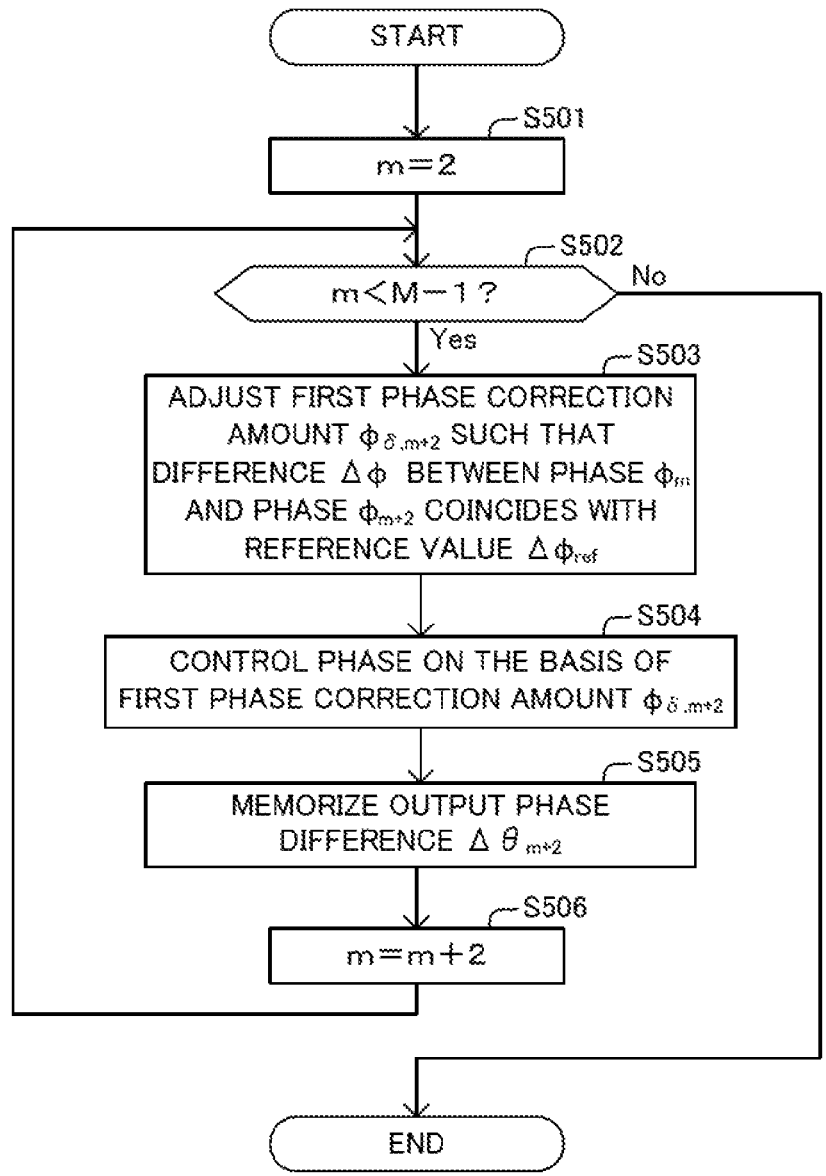
FIG. 21 is a flow diagram denoting an example of a process carried out by a digital signal processor of the fourth modification to the first embodiment.

The steps S501-S506 of FIG. 21 are the same as the steps S401-S406 of FIG. 20, respectively, except for the value of the loop counter m being set to two in step S501. The description of the process of FIG. 21, which is the same as the process of FIG. 20, is omitted here.

After completing the execution of the first parallel process, the digital signal processor 11 sets the initial flag to a predetermined "off" value (step S306 of FIG. 19). In succession, the digital signal processor 11 finishes the process of FIG. 19. The steps S302-S306 of FIG. 19 of this example are the initial process.

Next, description will now be made on assumption that the transmitting device 1 finishes its operation after the execution of the initial process and then restarts its operation.

Figure 22:
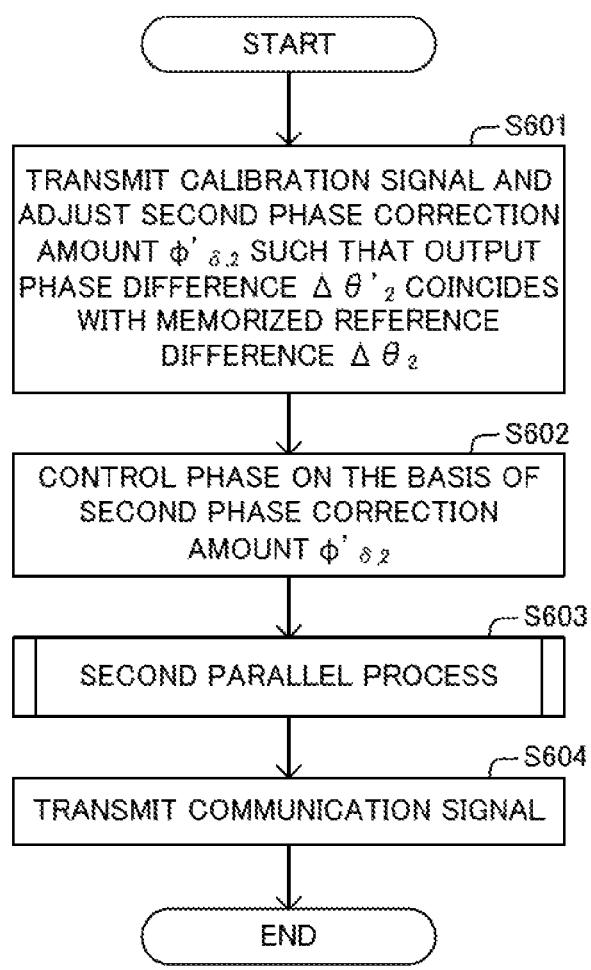
FIG. 22 is a flow diagram denoting an example of a process carried out by a digital signal processor of the fourth modification to the first embodiment.

In this case, since the initial flag is set to be the "off" value, the digital signal processor 11 determines "No" in step S301 of FIG. 19 and carries out a non-initial process denoted in FIG. 22 (step S307 of FIG. 19).

In the non-initial process, the digital signal processor 11 controls the BB processor 111 such that a calibration signal is transmitted. Accordingly, the transmitting device 1 transmits the calibration signal from each of the M transmission modules 12-1, . . . , and 12-M.

Furthermore, the digital signal processor 11 obtains the phase difference (in other words, output phase difference) $\Delta\theta'_2$ represented by a difference signal input from the transmitting module 12-2. The digital signal processor 11 adjusts the phase correction amount $\phi'_{\delta,2}$ for the transmitting module 12-2 such that the obtained output phase difference $\Delta\theta'_2$ coincides with the memorized reference difference $\Delta\theta_2$ (step S601 of FIG. 22). The phase correction amount $\phi'_{\delta,2}$ may be referred to as a second phase correction amount $\phi'_{\delta,2}$.

The process of step S601 of FIG. 22 is an example of a phase adjusting process. At this time, the phase adjusting process includes the processes of: selecting the transmitting module 12-1 as a reference module; selecting the transmitting module 12-2 as a comparative module; obtaining the difference $\Delta\theta'_2$ between the phase of the high-frequency signal generated by the generator 1222 of the reference module and the phase of the high-frequency signal generated by the generator 1222 of the comparative module; and adjusting the phase of a signal to be transmitted from the comparative module on the basis of the obtained difference $\Delta\theta'_2$.

The digital signal processor 11 determines the phase shift amount for the transmitting module 12-2 by adding the adjusted second phase correction amount $\phi'_{\delta,2}$ to the basic shift amount, and then outputs a control signal representing the determined phase shift amount to the transmitting module 12-2.

In this example, the phase shifter 1229 of the transmitting module 12-2 shifts the phase of a signal input from the DAC 1221 by the phase shift amount represented by the control signal input from the digital signal processor 11. Consequently, the digital signal processor 11 controls the phase of a signal to be transmitted from the transmitting module 12-2 (step S602 of FIG. 22).

Then, the digital signal processor 11 carries out a second parallel process (step S603 of FIG. 22). Specifically, the digital signal processor 11 of this example carries out, as the second parallel process, the process denoted in FIG. 23 in parallel with the process denoted in FIG. 24.

First, description will now be made in relation to the process denoted in FIG. 23.

Figure 23:
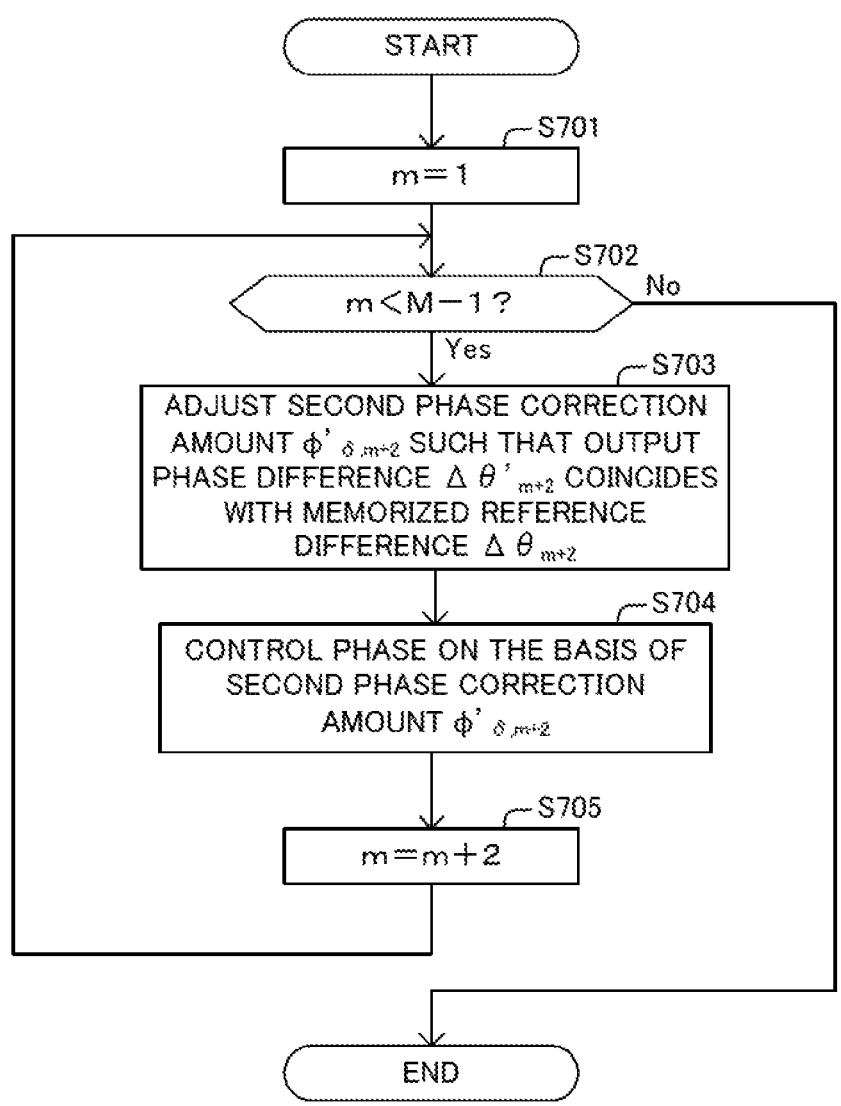
FIG. 23 is a flow diagram denoting an example of a process carried out by a digital signal processor of the fourth modification to the first embodiment.

The digital signal processor 11 sets the loop counter m to one (step S701 of FIG. 23). Next, the digital signal processor 11 determines whether the loop counter m is smaller than a value M−1 obtained by subtracting one from the number M of the transmitting modules 12 (step S702 of FIG. 23). At this time, since the loop counter m is smaller than a value M−1 obtained by subtracting one from the number M of the transmitting modules 12, the digital signal processor 11 determines "Yes".

The digital signal processor 11 obtains the phase difference (in other words, output phase difference) $\Delta\theta'_{m+2}$ represented by a difference signal input from the transmitting module 12-($m$+2). The digital signal processor 11 adjusts the phase correction amount $\phi'_{\delta,m+2}$ for the transmitting module 12-($m$+2) such that the obtained output phase difference $\Delta\theta'_{m+2}$ coincides with the memorized reference difference $\Delta\theta_{m+2}$ (step S703 of FIG. 23). The phase correction amount $\phi'_{\delta,m+2}$ may be referred to as a second phase correction amount $\phi'_{\delta,m+2}$.

The process of step S703 of FIG. 23 is an example of a phase adjusting process. In this example, the phase adjusting process includes the processes of: selecting the transmitting module 12-$m$ as a reference module; selecting the transmitting module 12-($m$+2) as a comparative module; obtaining the difference $\Delta\theta'_{m+2}$ between the phase of the high-frequency signal generated by the generator 1222 of the reference module and the phase of the high-frequency signal generated by the generator 1222 of the comparative module; and adjusting the phase of a signal to be transmitted from the comparative module on the basis of the obtained difference $\Delta\theta'_{m+2}$.

In this example, the digital signal processor controls the phases by repeating the phase adjusting process in a manner that each of the M transmitting modules 12-1, . . . , and 12-M is selected as at least one of the reference module and the comparative module. In this example, the digital signal processor 11 carries out M−2 phase adjusting processes in parallel. In this example, the digital signal processor 11 selects a transmitting module 12 having been selected as a reference module or a comparative module for the previous phase adjusting process as the reference module for the current phase adjusting process.

The digital signal processor 11 determines the phase shift amount for the transmitting module 12-($m$+2) by adding the adjusted second phase correction amount $\phi'_{\delta,m+2}$ to the basic shift amount. The digital signal processor 11 outputs a control signal representing the determined phase shift amount to the transmitting module 12-($m$+2).

In this example, the phase shifter 1229 of the transmitting module 12-($m$+2) shifts the phase of a signal input from the DAC 1221 by the phase shift amount represented by the control signal input from the digital signal processor 11. Thereby, the digital signal processor 11 controls the phase of a signal to be transmitted from the transmitting module 12-($m$+2) (step S704 of FIG. 23).

The digital signal processor 11 adds two to the loop counter m (step S705 of FIG. 23), and then returns to step S702 to repeat the process of steps S702 to S705.

After that, when the loop counter m reaches the value equal to or more than M−1 obtained by subtracting one from the number M of the transmitting modules 12, the digital signal processor 11 determines "No" in step S702 and finishes the process of FIG. 23.

Figure 24:
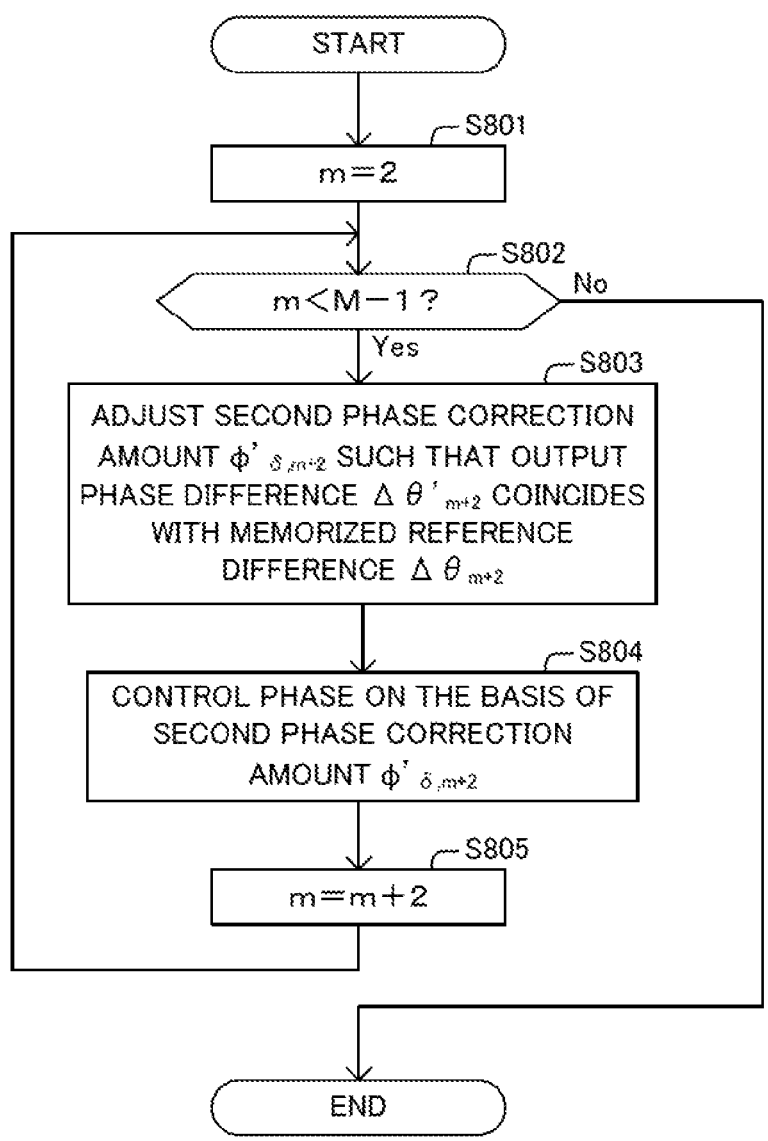
FIG. 24 is a flow diagram denoting an example of a process carried out by a digital signal processor of the fourth modification to the first embodiment.

The steps S801-S805 of FIG. 24 are the same as the steps S701-S705 of FIG. 23, respectively, except for the value of the loop counter m being set to two in step S801. The description of the process of FIG. 24, which is the same as the process of FIG. 23, is omitted here.

After the completion of the second parallel process, the digital signal processor 11 transmits a communication signal from each of the M transmitting modules 12-1, . . . , and 12-M (step S604 of FIG. 22), and then finishes the process of FIG. 22. Finally, the digital signal processor 11 finishes the process of FIG. 19.

As described above, the transmitting device 1 of the fourth modification to the first embodiment provides effects and advantages the same as those of the transmitting device 1 of the first embodiment.

Furthermore, the transmitting device 1 of the fourth modification to the first embodiment carries out M−2 phase adjusting processes in parallel. The transmitting device 1 selects a transmitting module 12 having been selected as a reference module or a comparative module for the previous phase adjusting process as the reference module for the current phase adjusting process.

This manner can accomplish M−2 phase adjusting processes faster than cases where M−2 phase adjusting processes are successively carried out.

Fifth Modification to the First Embodiment

Next, description will now be made in relation to a transmitting device according to a fifth modification to the first embodiment. The transmitting device of the fifth modification is different from the transmitting device of the first embodiment in the point of coupling a transmitting module to the antennas in an interleaving manner. Hereinafter, the description will focus on the difference. Like reference numbers designate the same as or substantially similar elements between the first embodiment and the fifth modification.

Figure 25:
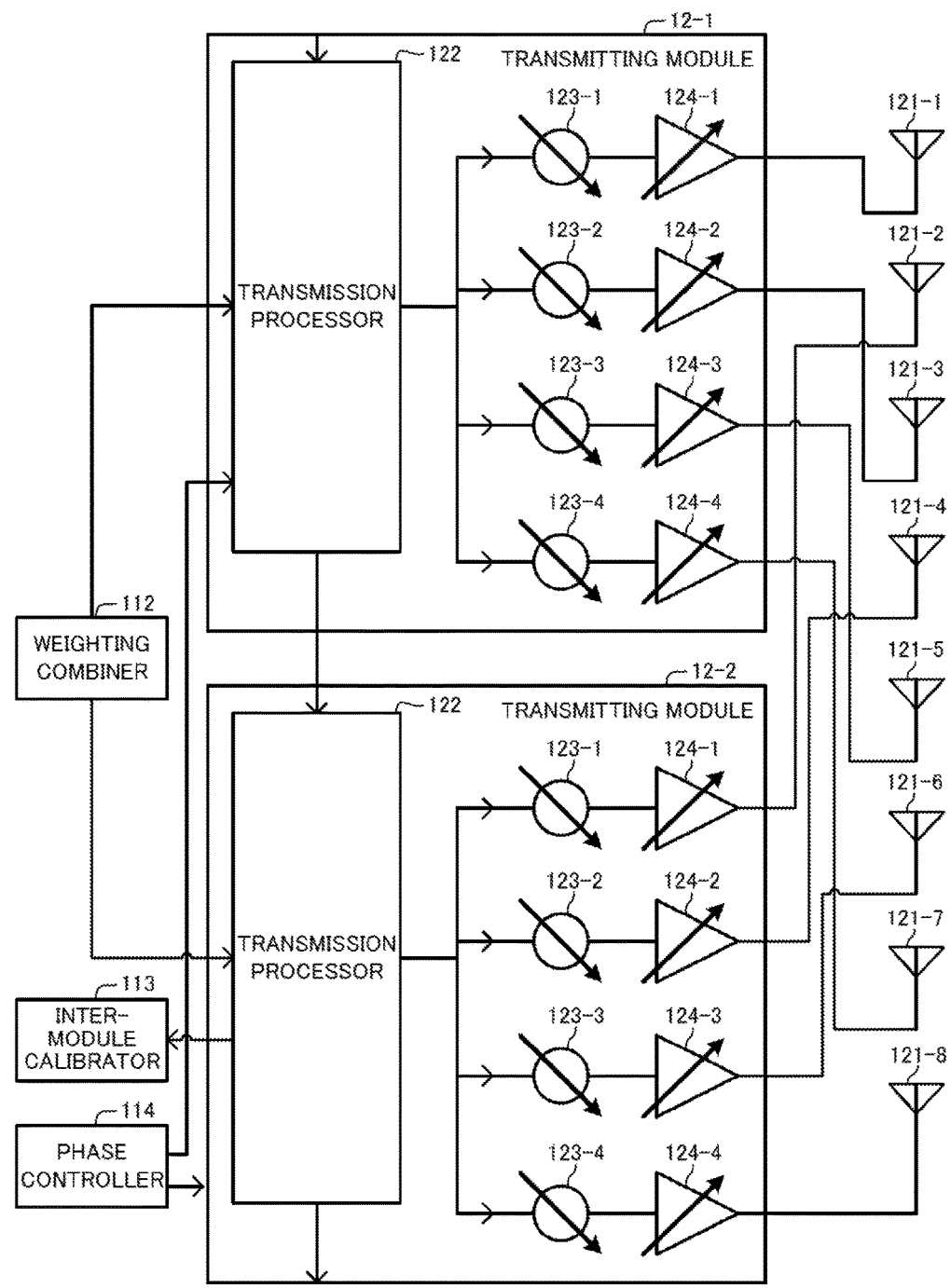
FIG. 25 is a block diagram schematically illustrating an example of the configuration of a transmitting device of a fifth modification to the first embodiment.

As illustrated in FIG. 25, the transmitting device 1 of the fifth modification to the first embodiment includes, for example, multiple (eight in this example) antennas 121-1 through 121-8 in place of the antennas 121-1, . . . , and 121-N included in the transmitting modules 12 of the first embodiment. In this example, the number M of the transmitting modules 12 is two, so the number N of antennas coupled to each transmitting module 12-m is four.

For example, the M·N antennas 121-1 through 121-8 are disposed on a straight line at regular intervals.

The amplitude modifiers 124-1 through 124-4 of the transmitting module 12-1 are coupled to the antennas 121-1, 121-3, 121-5, and 121-7, respectively.

The amplitude modifiers 124-1 through 124-4 of the transmitting module 12-2 are coupled to the antennas 121-2, 121-4, 121-6, and 121-8, respectively.

Namely, in the transmitting device 1, the transmitting modules 12-1 and 12-2 are coupled to the antennas 121-1 through 121-8 in accordance with an interleaving scheme.

As described above, the transmitting device 1 of the fifth modification to the first embodiment provides effects and advantages the same as those of the transmitting device 1 of the first embodiment.

Second Embodiment

Description will now be made in relation to a receiving device according to a second embodiment.

(Configuration)

Figure 26:
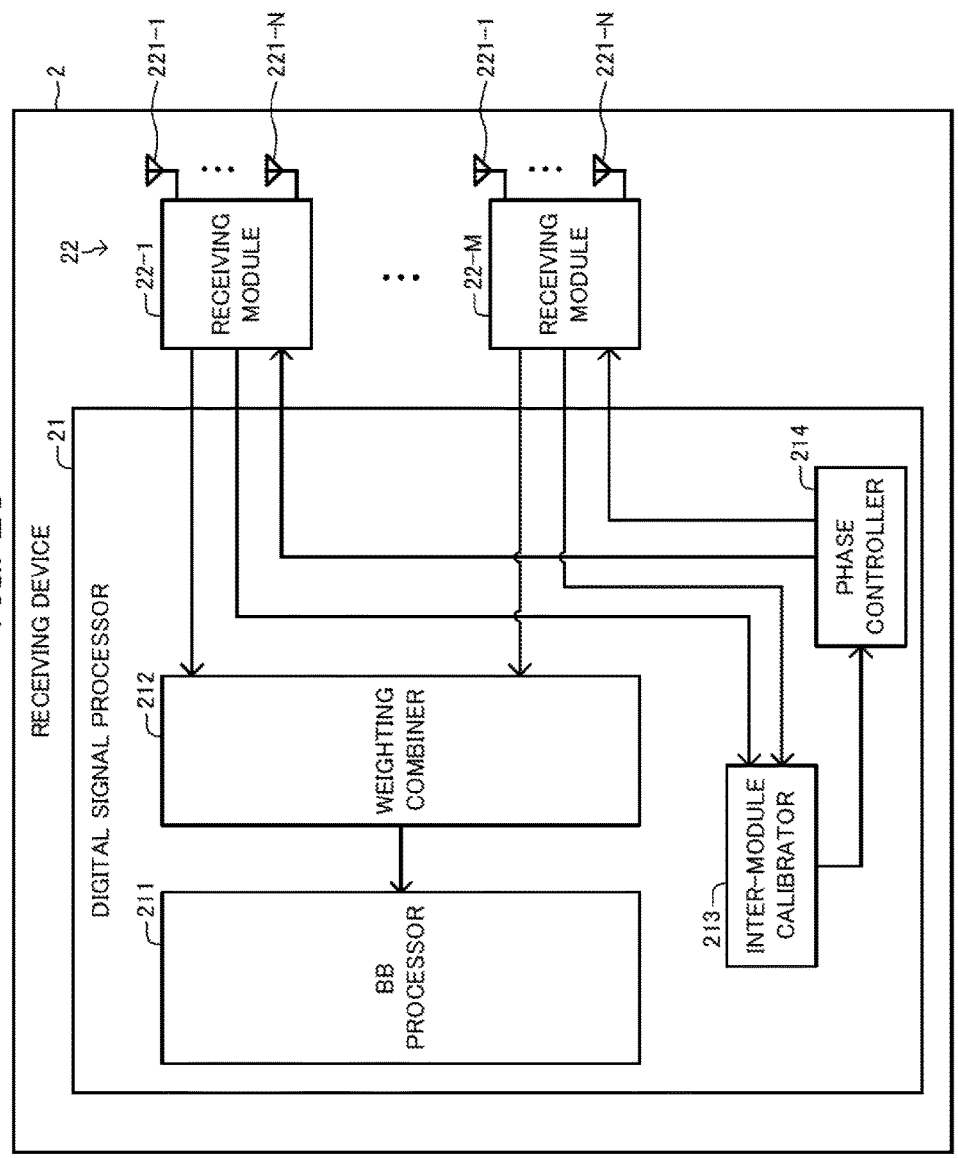
FIG. 26 is a block diagram schematically illustrating an example of the configuration of a receiving device according to a second embodiment.

As illustrated in FIG. 26, the receiving device 2 of the second embodiment includes, for example, a digital signal processor 21 and a receiver 22. The receiving device 2 is an example of a wireless device.

The digital signal processor 21 includes a BB processor 211, a weighting combiner 212, an inter-module calibrator 213, and a phase controller 214. The weighting combiner 212 may also be referred to as a weighting combiner-divider or a weighting divider.

The receiver 22 includes M receiving modules 22-1, . . . , and 22-M. In this example, the symbol M represents an integer of two or more. Hereinafter, when there is no need to discriminate a receiving module 22-m from the remaining receiving modules, the receiving module 22-m is also referred to as the receiving module 22. Here, the symbol m represents each of integers from 1 to M.

Figure 27:
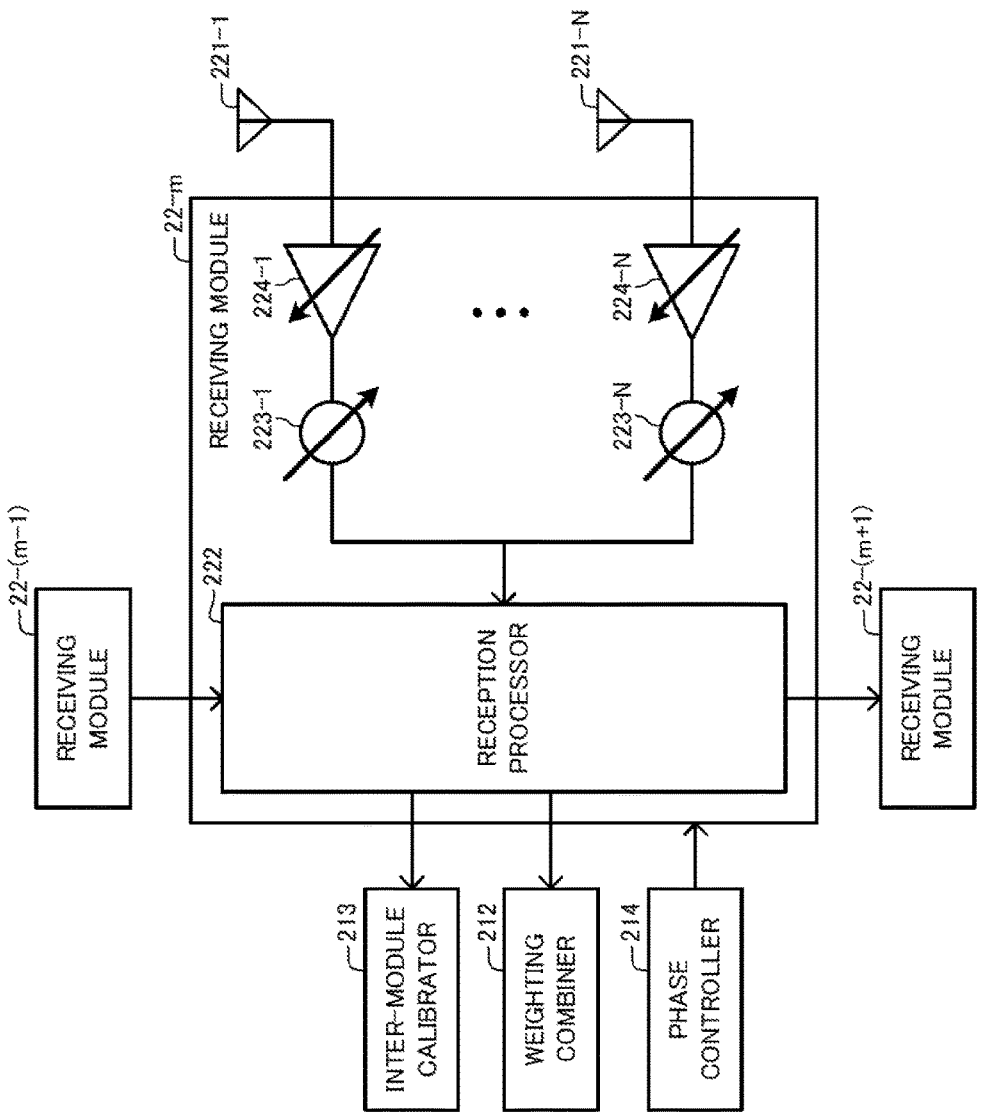
FIG. 27 is a block diagram schematically illustrating an example of the configuration of a receiving module of FIG. 26.

For example, as illustrated in FIG. 27, the receiving module 22-m includes N antennas 221-1, . . . , and 221-N, a reception processor 222, N phase shifters 223-1, . . . , and 223-N; and N amplitude modifiers 224-1, . . . , and 224-N. In this example, the symbol N represents an integer of one or more. Hereinafter, when there is no need to discriminate the antenna 221-n, the phase shifter 223-n, and the amplitude modifier 224-n from the remaining elements of the respective same types, these elements may also be referred to as the antenna 221, the phase shifter 223, and the amplitude modifier 224, respectively. Here, the symbol n represents each of integers from 1 to N.

The number N of the antennas 221-1, . . . , and 221-N may be different with the receiving modules 22.

The receiver 22-m receives a signal through N antennas 221-1, . . . , and 221-N.

The amplitude modifier 224-n modifies the amplitude of a signal (in other words, received signal) received through the antenna 22-n, and outputs the modified received signal to the phase shifter 223-n.

The phase shifter 223-n shifts the phase of the received signal input from the amplitude modifier 224-n and outputs the shifted received signal to the reception processor 222.

The reception processor 222 generates a high-frequency signal and generates a demodulated signal obtained by demodulating the received signal input from the phase shifter 223-n on the basis of the generated high-frequency signal. The reception processor 222 outputs the generated demodulated signal to the weighting combiner 212.

In this example, the high-frequency signal has a frequency in the range of the millimeter wave band. Alternatively, the frequency of the high-frequency signal may be in the range of a frequency band different from the millimeter wave band.

The receiving device 2 forms beams by controlling the phases and the amplitudes of signals to be received through the N antennas 221-1, . . . , and 221-N of each of the M receiving modules 22-1, . . . , and 22-M. For example, the receiving device 2 may control the directions of the beam independently in each of two directions perpendicular to each other.

The multiple antennas (in this example, N·M antennas) 221 included in the receiving device 2 can be regarded as a phased array antenna.

For example, a signal received by the receiving device 2 is transmitted from a transmitting device. In this case, the receiving device 2 wirelessly communicates with the transmitting device.

The receiving device 2 may be a radar device that wirelessly transmits a signal and detects the location of an object by detecting a signal which is transmitted from the receiving device 2 and is reflected on the object. In this case, the receiving device 2 may omit at least part of the function of demodulating a signal on the basis of a high-frequency signal and processing a BB signal.

The weighting combiner 212 generates P BB signals by carrying out weighting and combining process on the demodulated signals input from the M receiving modules 22-1, . . . , 22-M. In this example, the weighting and combining process includes a process of modifying the phase and the amplitude of the BB signal; and a process of multiplying the P BB signals by a precoding matrix. In this example, the symbol P represents an integer of one or more. The P BB signals of this example may form P data streams. The weighting combiner 212 outputs the generated P BB signals to the BB processor 211.

The BB processor 211 processes the P BB signals input from the weighting combiner 212.

Figure 28:
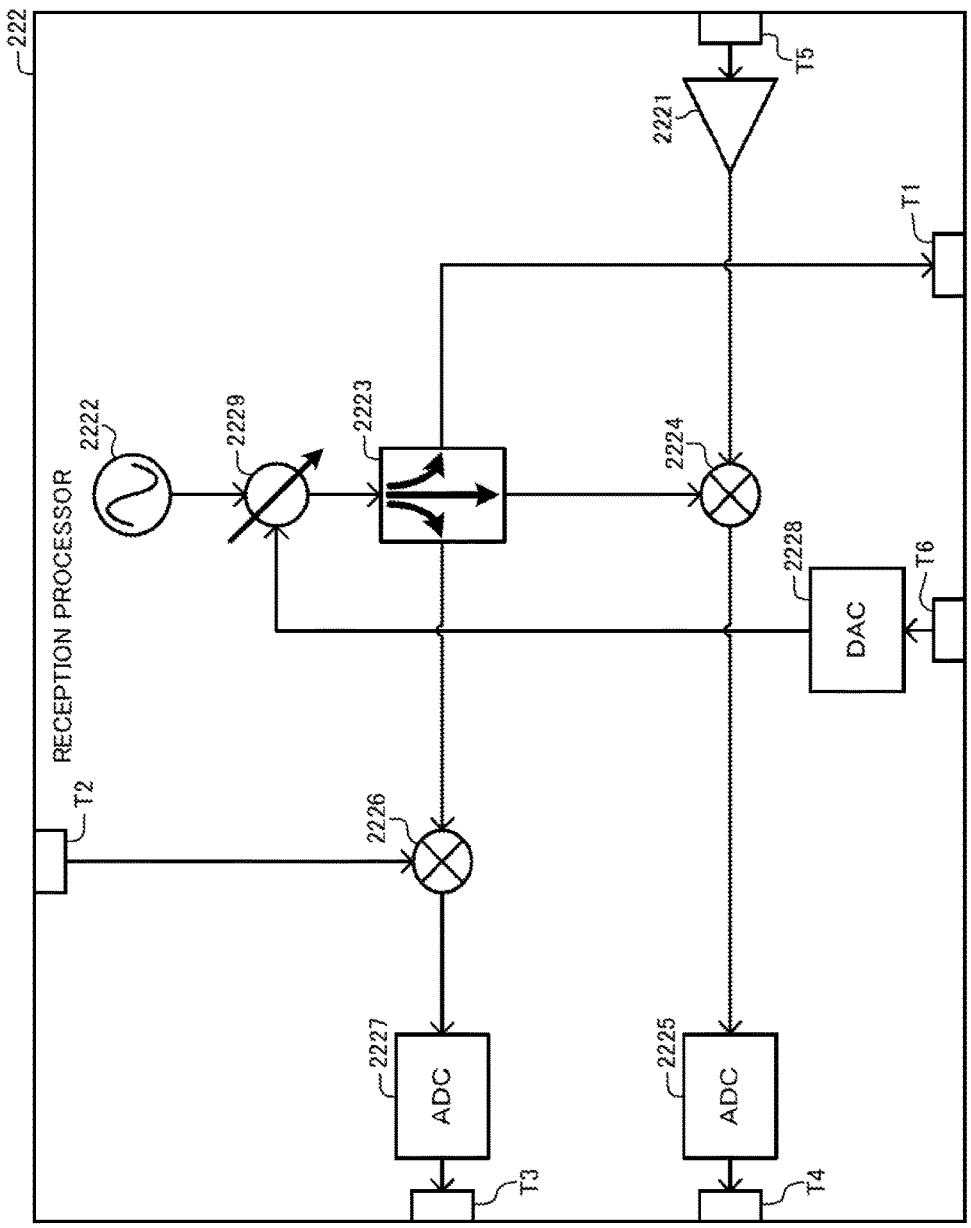
FIG. 28 is a block diagram illustrating an example of the configuration of a reception processor of FIG. 27.

As illustrated in FIG. 28, the reception processor 222 includes, for example, six terminals T1-T6, an amplifier 2221, a generator 2222, a divider 2223, a demodulator 2224, an ADC 2225, a comparator 2226, an ADC 2227, a DAC 2228, and a phase shifter 2229. The demodulator 2224 and the amplifier 2221 are at least part of a high-frequency circuit.

Into the terminal T5, a signal is input from an entity (in this example, each of the N phase shifters 223-1, . . . , and 223-N) external to the local receiving module 22-$m$ that includes the terminal T5. The terminal T5 is an example of an input terminal. The terminal T5 outputs the input signal to the amplifier 2221.

The amplifier 2221 amplifies the signal input from the terminal T5 and outputs the amplified signal into the demodulator 2224.

The generator 2222 generates a high-frequency signal. Into the generator 2222 of each receiving module 22 of this example, an oscillation signal generated by a non-illustrated oscillator is input. In this example, the oscillation signal has a frequency lower than that of the high-frequency signal. The generator 2222 of this example includes a PLL. In this example, a ratio of the frequency of an input signal to the frequency of an output signal in the generator 2222 are common to the M receiving modules 22-1, . . . , and 22-M.

The generator 2222 outputs the generated high-frequency signal to the phase shifter 2229. The phase shifter 2229 will be detailed below.

The divider 2223 divides the signal input from the phase shifter 2229 into multiple (in this example, three) divided signals. Among the multiple divided signals, the divider 2223 outputs a first divided signal to the terminal T1; outputs a second divided signal to the comparator 2226; and outputs a third divided signal to the demodulator 2224.

The demodulator 2224 generates a demodulated signal by demodulating the signal input from the amplifier 2221 on the basis of a signal input from the divider 2223. In this example, the demodulator 2224 includes a mixer. The demodulator 2224 outputs the generated demodulated signal to the ADC 2225.

The ADC 2225 converts the demodulated signal input from the demodulator 2224 from an analog signal into a digital signal, and then outputs the converted demodulated signal to the terminal T4.

The terminal T4 outputs the demodulated signal input from the ADC 2225 to an entity (in this example, the weighting combiner 212) external to the local receiving module 22-$m$ including the terminal T4. The terminal T4 is an example of an output terminal.

Into the terminal T2, a signal is input from an entity (in this example, the terminal T1 of the receiving module 22-($m$−1), where m represents an integer of two or more) external to the local receiving module 22-$m$ that includes the terminal T2. Here, the receiving module 22-($m$−1) is an example of a receiving module 22 different from the receiving module 22-$m$. The terminal T2 is an example of a second terminal. The terminal T2 outputs the input signal to the comparator 2226.

The comparator 2226 outputs a difference signal representing a difference of the phase of the signal input from the terminal T2 and the phase of the second divided signal input from the divider 2223 to the ADC 2227. The comparator 2226 of this example includes a mixer.

The ADC 2227 converts the difference signal input from the comparator 2226 from an analog signal to a digital signal. The ADC 2227 outputs the converted difference signal to the terminal T3.

The terminal T3 outputs the difference signal input from the ADC 2227 to an entity (in this example, the inter-module calibrator 213) external to the local receiving module 22-$m$ that includes the terminal T3. The terminal T3 is an example of a third terminal.

Into the terminal T6, a control signal is input from an entity (in this example, the phase controller 214) external to the local receiving module 22-$m$ that includes the terminal T6. The control signal in this example represents a phase shift amount. In this example, the phase shift amount represents an amount of a phase to be shifted by the phase shifter 2229. The terminal T6 outputs the input control signal to the DAC 2228.

The DAC 2228 converts a control signal input from the terminal T6 from a digital signal to an analog signal. The DAC 2228 outputs the converted control signal to the phase shifter 2229.

The phase shifter 2229 shifts the phase of the high-frequency signal input from the generator 2222 on the basis of the control signal input from the DAC 2228. In this example, the phase shifter 2229 shifts the phase of the high-frequency signal input from the generator 2222 by a phase shift amount represented by the control signal input from the DAC 2228. Then the phase shifter 2229 outputs the shifted signal to the divider 2223. In other words, the phase shifter 2229 of this example shifts the phase of a signal between the generator 2222 and the divider 2223.

The inter-module calibrator 213 obtains the differences in phase among the M high-frequency signals each time the M receiving modules 22-1, . . . , and 22-M starts generation of the M high-frequency signals. In this example, the phase difference represented by a difference signal input from the receiving module 22-($m$+1) corresponds to the difference between the phase of the high-frequency signal generated by the receiving module 22-$m$ and the phase of the high-frequency signal generated by the receiving module 22-($m$+1).

The inter-module calibrator 213 determines the phase correction amount for each receiving module 22 on the basis of the obtained difference among the phases of the M high-frequency signals. In this example, the inter-module calibrator 213 adjusts the phase correction amounts for the receiving modules 22-2, ..., and 22-M on the basis of the phase differences represented by the difference signals input from the receiving modules 22-2, ..., and 22-M, respectively. The inter-module calibrator 213 outputs a signal representing the phase correction amount determined for each receiving module 22 to the phase controller 214.

The phase controller 214 determines the phase shift amount for each receiving module 22 on the basis of the phase correction amount for each receiving module 22 represented by the signals input from the inter-module calibrator 213. In this example, the phase controller 214 determines the phase shift amount for each receiving module 22 by adding the phase correction amount to a base shift amount predetermined in accordance with the direction of the beam formed by the receiving device 2.

The phase controller 214 outputs a control signal representing the phase shift amount determined for each receiving module 22 to the receiving module 22. This allows the phase controller 214 to control the phase shifter 2229 included in each receiving module 22.

In this embodiment, the inter-module calibrator 213 and the phase controller 214 carry out the initial process when carrying out the phase control for the first time (e.g., when the receiving device 2 operates for the first time).

In this example, the initial process includes: a process of obtaining, when the difference among the phases of the M signals respectively received by the M receiving modules 22-1, ..., and 22-M coincides with a predetermined reference value, the phase difference (in other words, output phase difference) of the M high-frequency signals; and a process of memorizing the obtained output phase difference as a reference difference.

In this example, whether the difference of the phases of the M signals coincides with the reference value is determined on the basis of the receiving power or the phase of signals which is transmitted from a transmitting device disposed on a position along a predetermined direction from the receiving device 2 and is received at the receiving device 2.

In this example, the inter-module calibrator 213 and the phase controller 214 carry out a non-initial process after carrying out the initial process.

In this example, the non-initial process includes a process of controlling a phase on the basis of the difference between the difference (in other words, output phase difference) of the phases of the M high-frequency signals and the memorized reference difference.

The digital signal processor 21 functions by means of an LSI. The digital signal processor 21 of this example includes a non-volatile memory that stores therein an initial flag set to a predetermined "on" value in advance.

Alternatively, the digital signal processor 21 may achieve its function by means of a PLD. Further alternatively, the digital signal processor 21 may include a processor and a memory, and at least part of the function of the digital signal processor 21 may be achieved by the processor executing a program stored in the memory.

An example of the processor is a CPU or a DSP. An example of the memory is at least one of a RAM, a ROM, an HDD, an SSD, a semiconductor memory, and an organic memory. Alternatively, the memory may include a recoding medium such as a flexible disk, an optical disk, a magneto-optical disk, or a semiconductor memory, and a reader capable of reading information from the recording medium.

The receiving device 2 functions likewise the transmitting device 1 except for receiving a signal in place of transmitting a signal. Accordingly, the operation of the receiving device 2 will be additionally detailed in the above description of the operation of the transmitting device 1.

As described above, the receiving device 2 of the second embodiment provides effects and advantages the same as those of the transmitting device 1 of the first embodiment.

Figure 29:
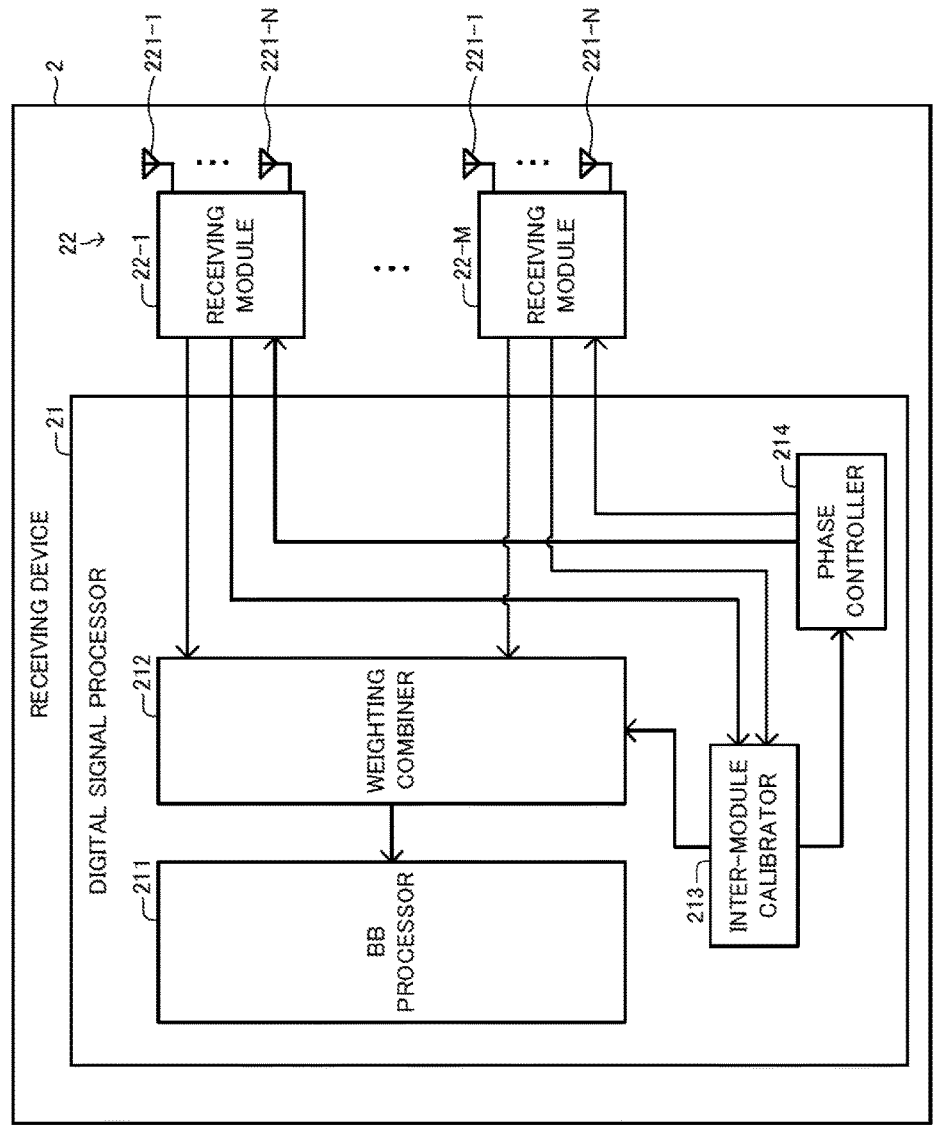
FIG. 29 is a block diagram schematically illustrating another example of the configuration of a receiving device of the second embodiment.

Alternatively, as illustrated in FIG. 29, the inter-module calibrator 213 may output a signal representing the phase correction amount determined for each receiving module 22 to the weighting combiner 212 in place of the phase controller 214. In this case, the weighting combiner 212 carries out the weighting and combining process on the basis of the phase correction amount for each receiving module 22 represented by the signal input from the inter-module calibrator 213.

With this configuration, the phase shift by the weighting combiner 212 is not reflected in a signal input into the comparator 2226. In other words, the receiving device 2 controls a phase in accordance with a feed-forward control method, so that the phase control can be accomplished rapidly.

Since the function of controlling a phase is achieved by the digital signal processor 21 that processes a digital signal, so that the production cost of the receiving device 2 can be reduced.

Figure 30:
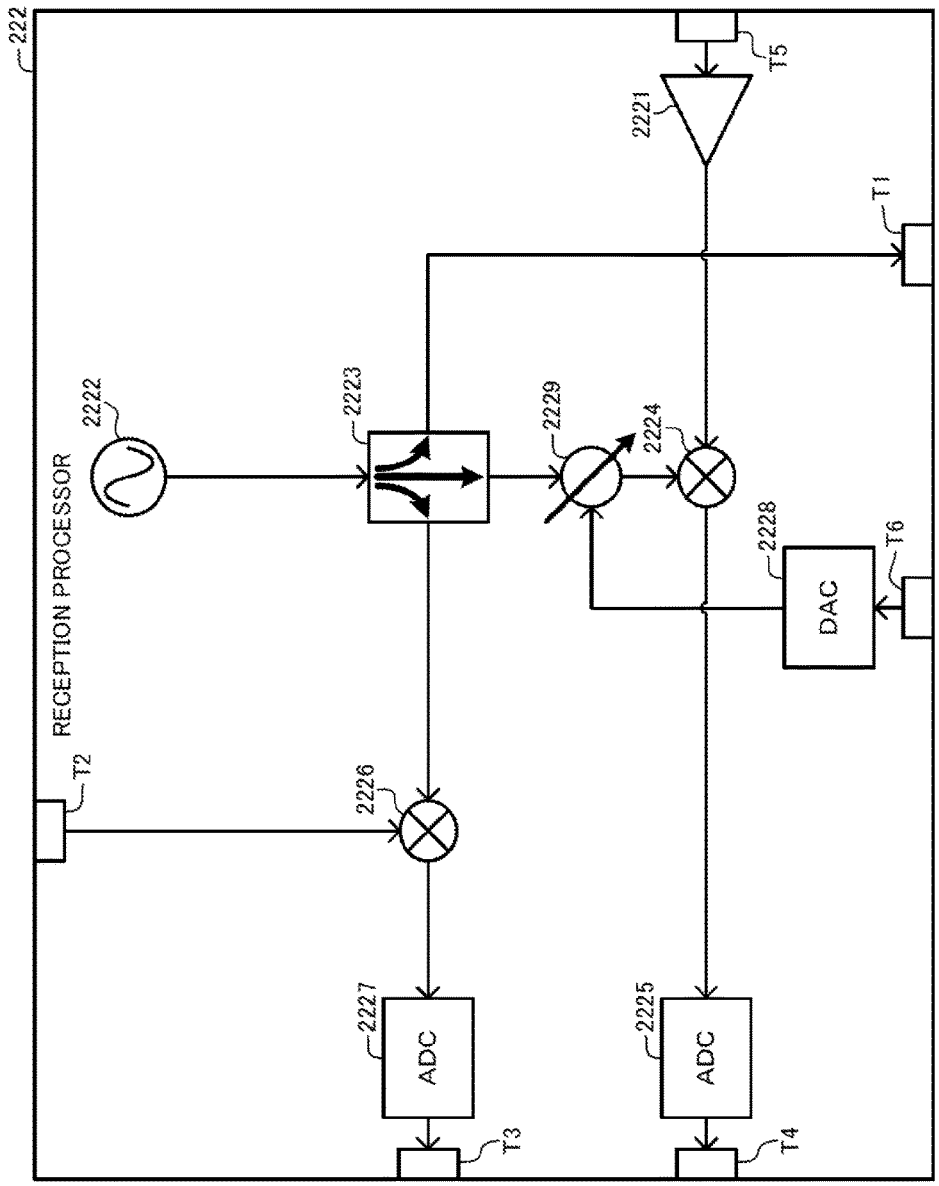
FIG. 30 is a block diagram illustrating another example of the configuration of a reception processor of the second embodiment.

As illustrated in FIG. 30, the phase shifter 2229 may be disposed between the divider 2223 and the demodulator 2224. In this case, the phase shifter 2229 shifts the phase of a signal between the divider 2223 and the demodulator 2224.

With this configuration, the phase shift by the phase shifter 2229 is not reflected in a signal input into the comparator 2226. In other words, the receiving device 2 controls a phase in accordance with a feed-forward control method, so that the phase control can be accomplished rapidly.

The phase shifter 2229 may be disposed out of the route that connects a circuit (in this example, the digital signal processor 21) that processes a BB signal and the antennas 221-1, ..., and 221-N. This configuration makes it possible to shorten the route as compared with a configuration in which the phase shifter 2229 is disposed on the route and consequently makes it possible to suppress the loss of a signal transmitted through the route. Accordingly, this configuration can suppress degrading a quality of a signal transmitted through the route.

Figure 31:
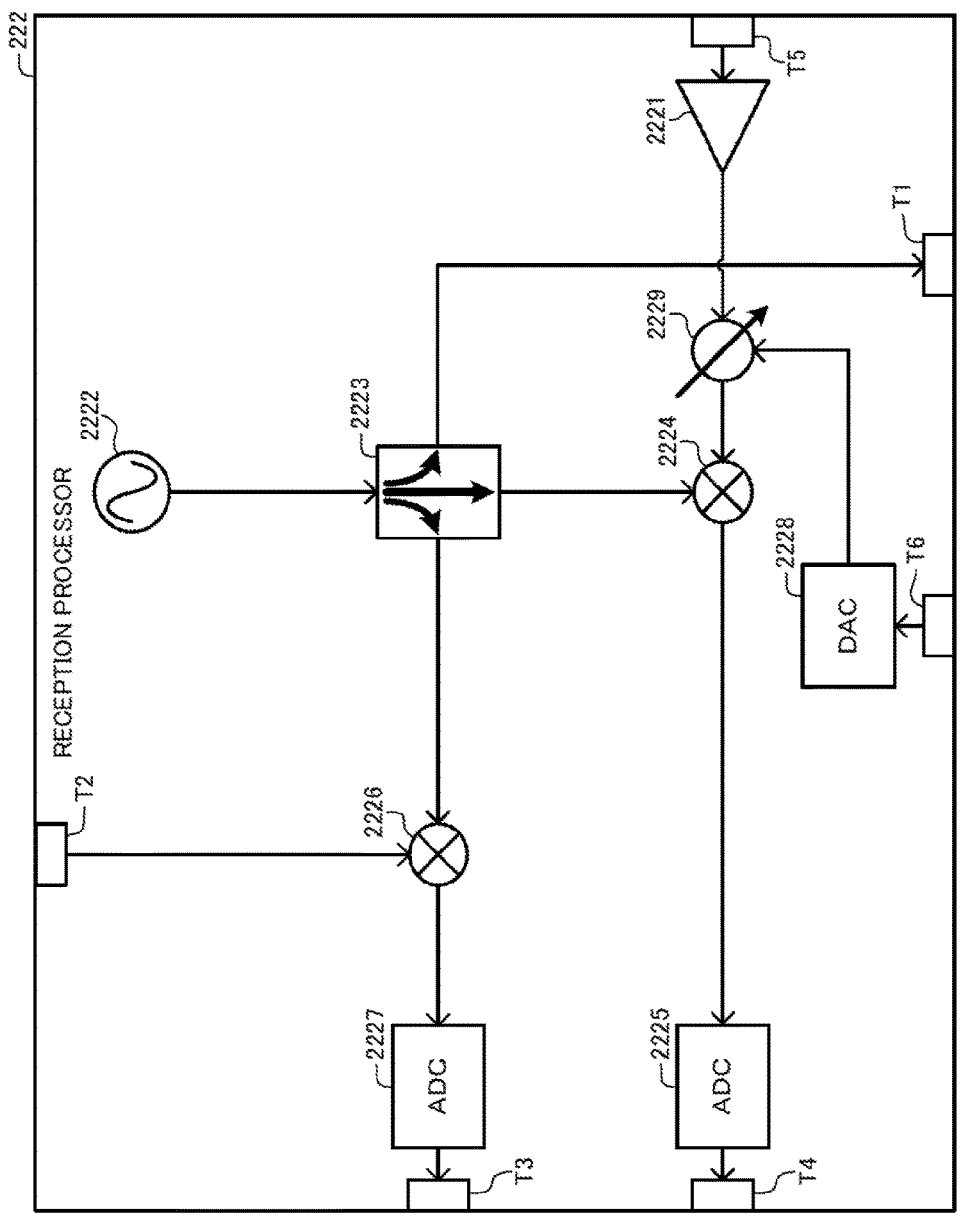
FIG. 31 is a block diagram illustrating another example of the configuration of a reception processor of the second embodiment.

Alternatively, as illustrated in FIG. 31, the phase shifter 2229 may be disposed between the input terminal T5 and the demodulator 2224. In this case, the phase shifter 2229 shifts the phase of a signal between the input terminal T5 and the demodulator 2224.

With this configuration, the phase shift by the phase shifter 2229 is not reflected in a signal input into the comparator 2226. In other words, the receiving device 2 controls a phase in accordance with a feed-forward control method, so that the phase control can be accomplished rapidly.

Figure 32:
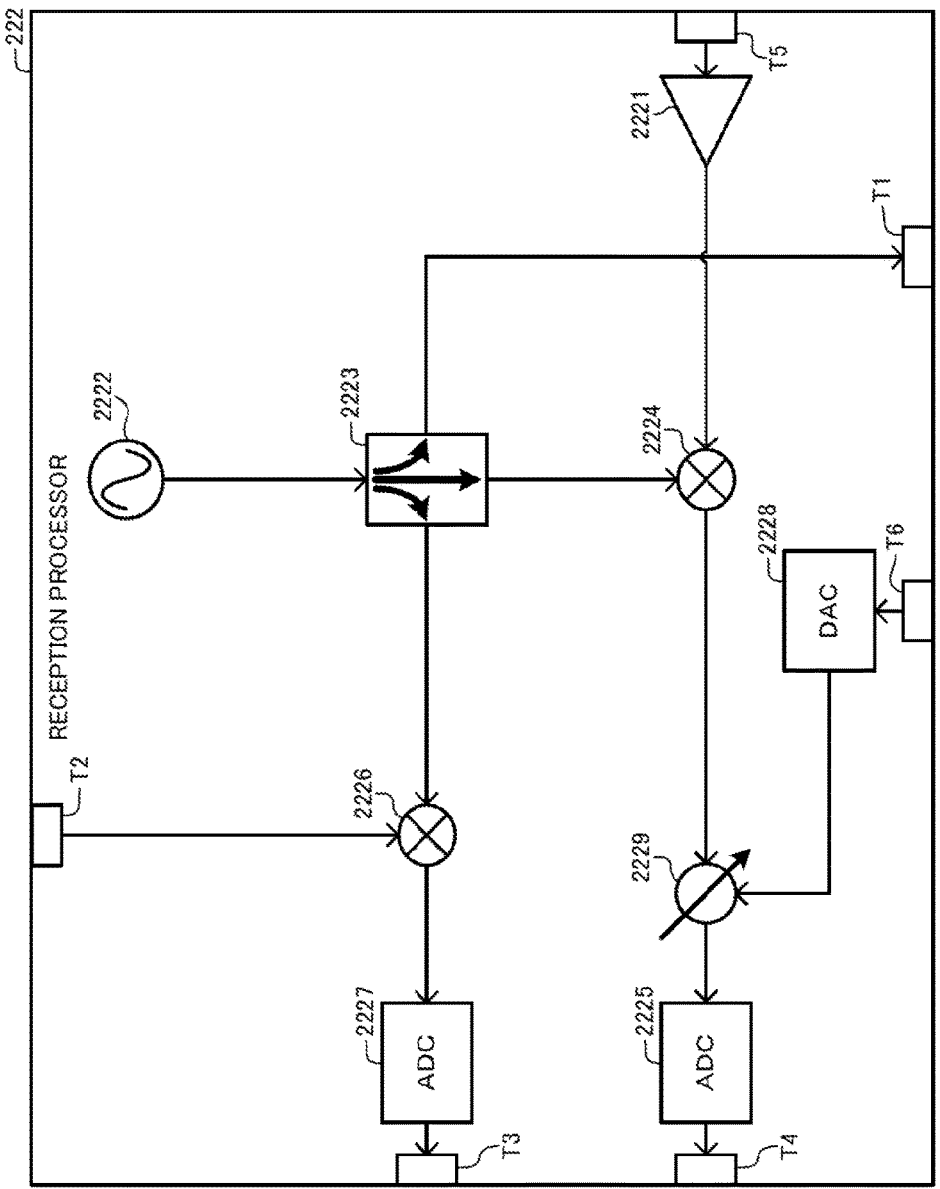
FIG. 32 is a block diagram illustrating another example of the configuration of a reception processor of the second embodiment.

Further alternatively, as illustrated in FIG. 32, the phase shifter 2229 may be disposed between the demodulator 2224 and the output terminal T4. In this case, the phase shifter 2229 shifts the phase of a signal between the demodulator 2224 and the terminal T4.

With this configuration, the phase shift by the phase shifter 2229 is not reflected in a signal input into the comparator 2226. In other words, the receiving device 2 controls a phase in accordance with a feed-forward control method, so that the phase control can be accomplished rapidly.

Alternatively, in the receiving device 2, the N phase shifters 223-1, . . . , and 223-N may shift the phase in place of the phase shifter 2229.

Alternatively, the receiving device 2 may include the function of the transmitting device 1 in addition to the function of the receiving device 2.

According to the above disclosure, the quality of a wireless signal can be enhanced.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A wireless device comprising:
 a plurality of antenna; and
 a plurality of wireless hardware modules configured to transmit or receive signals via the plurality of antennas,
 each of the plurality of wireless hardware modules configured to:
 generate a high-frequency signal; and
 transmit or receive, based on the generated high-frequency signal, a signal via at least one of the plurality of antennas,
 wherein the wireless device further comprises a hardware processor configured to obtain, each time the plurality of wireless hardware modules start generation of a plurality of the high-frequency signals, a difference of phases of the plurality of high-frequency signals when a difference of phases of a plurality of signals transmitted or received by the plurality of wireless hardware modules coincides with a reference value, memorize the obtained difference as a reference difference, and control, based on the difference of the phases of the high-frequency signals and the memorized reference difference, at least one phase of a plurality of signals to be transmitted or received by the plurality of wireless hardware modules after memorizing the reference difference.

2. The wireless device according to claim 1, wherein:
 the high-frequency circuit transmits, based on the generated high-frequency signal, the signal via at least one of the plurality of antennas; and
 whether the difference of the phases of the plurality of signals coincides with the reference value is determined, based on power or phases of received signals emitted from the plurality of antennas at an external entity to the wireless device.

3. The wireless device according to claim 1, wherein
 the hardware processor is further configured to control the at least one phase by:
 selecting one of the plurality of wireless hardware modules as a reference module and selects another one of the plurality of wireless hardware modules as a comparative module;
 obtaining a difference between a phase of a high-frequency signal generated by the generator in the reference module and a phase of a high-frequency signal generated by the generator in the comparative module; and
 repeating a phase adjusting process that adjusts, based on the obtained difference, a phase of a signal to be transmitted or received by the comparative module in a manner that each of the plurality of wireless hardware modules is selected as at least one of the reference module and the comparative module.

4. The wireless device according to claim 3, wherein
 the hardware processor is further configured to successively carry out a plurality of the phase adjusting processes and selects the wireless hardware module selected as the comparative module for a previous phase adjusting process as the reference module for a current phase adjusting process.

5. The wireless device according to claim 3, wherein
 the hardware processor is further configured to carry out a plurality of the phase adjusting processes in parallel and selects the wireless hardware module selected as the reference module or the comparative module for a previous phase adjusting process as the reference module for a current phase adjusting process.

6. The wireless device according to claim 1, wherein
 the wireless device forms a beam by controlling phases and amplitudes of the plurality of signals to be transmitted or received by the plurality of wireless hardware modules.

7. A wireless device comprising:
 a plurality of antenna; and
 a plurality of wireless hardware modules configured to transmit or receive signals via the plurality of antennas,
 each of the plurality of wireless hardware modules configured:
 generate a high-frequency signal; and
 transmit or receive, based on the generated high-frequency signal, a signal via at least one of the plurality of antennas,
 wherein each of the plurality of wireless hardware modules comprises:
 a first terminal configured to output the high-frequency signal generated by the generator in the wireless hardware module externally to the wireless hardware module;
 a second terminal configured to receive a high-frequency signal generated by the generator in a second wireless hardware module different from the wireless hardware module;
 a comparator configured to output a difference signal representing a difference between a phase of the received high-frequency signal and a phase of the high-frequency signal generated by the generator in the wireless hardware module; and
 a third terminal configured to output the difference signal externally to the wireless hardware module, and
 wherein the wireless device further comprises a hardware processor configured to obtain, each time the plurality of wireless hardware modules start generation of a plurality of the high-frequency signals, a difference of phases of the plurality of high-frequency signals, and control, based on the obtained difference, at least one phase of a plurality of signals to be transmitted or received by the plurality of wireless hardware modules.

8. The wireless device according to claim 7, wherein
 each of the plurality of wireless hardware modules further comprises:

an input terminal configured to receive a baseband signal from an external entity to the wireless hardware module;

a modulator configured to receive the high-frequency signal generated by the generator in the wireless hardware module and the baseband signal, and outputs a modulated signal obtained by modulating, based on the baseband signal, the high-frequency signal;

a divider configured to divide the modulated signal into plurality of divided signals including a first divided signal, a second divided signal, and a third divided signal, outputs the first divided signal to the first terminal, and outputs the second divided signal to the comparator; and an output terminal configured to output the third divided signal externally to the wireless hardware module.

9. The wireless device according to claim 8, wherein:
each of the plurality of wireless hardware modules further comprises a phase shifter configured to shift a phase of a signal between the divider and the output terminal; and
the hardware processor controls the at least one phase by controlling the phase shifter.

10. The wireless device according to claim 8, wherein:
each of the plurality of wireless hardware modules further comprises a phase shifter configured to shift a phase of a signal between the modulator and the divider; and
the hardware processor controls the at least one phase by controlling the phase shifter.

11. The wireless device according to claim 8, wherein:
each of the plurality of wireless hardware modules further comprises a phase shifter configured to shift a phase of a signal between the generator and the modulator; and
the hardware processor controls the at least one phase by controlling the phase shifter.

12. The wireless device according to claim 8, wherein:
each of the plurality of wireless hardware modules further comprises a phase shifter configured to shift a phase of a signal between the input terminal and the modulator; and
the hardware processor controls the at least one phase by controlling the phase shifter.

13. The wireless device according to claim 7, wherein:
each of the plurality of wireless hardware modules further comprises:
a divider configured to divide the high-frequency signal generated by the generator in the wireless hardware module into a plurality of divided signals including a first divided signal, a second divided signal, and a third divided signal, and outputs the first divided signal to the first terminal, and outputs the second divided signal to the comparator;
an input terminal configured to receive a signal wirelessly received from an external entity to the wireless hardware module;

a demodulator configured to receive the third divided signal and the received signal, and outputs a demodulated signal obtained by demodulating, based on the high-frequency signal, the received signal; and an output terminal configured to output the demodulated signal externally to the wireless hardware module.

14. The wireless device according to claim 13, wherein:
each of the plurality of wireless hardware modules further comprises a phase shifter configured to shift a phase of a signal between the input terminal and the demodulator; and
the controller performs the control of the at least one phase by controlling the phase shifter.

15. The wireless device according to claim 13, wherein:
each of the plurality of wireless hardware modules further comprises a phase shifter configured to shift a phase of a signal between the generator and the divider; and
the controller performs the control of the at least one phase by controlling the phase shifter.

16. The wireless device according to claim 13, wherein:
each of the plurality of wireless hardware modules further comprises a phase shifter configured to shift a phase of a signal between the divider and the demodulator; and
the controller performs the control of the at least one phase by controlling the phase shifter.

17. The wireless device according to claim 13, wherein:
each of the plurality of wireless hardware modules further comprises a phase shifter configured to shift a phase of a signal between the output terminal and the demodulator; and
the controller performs the control of the at least one phase by controlling the phase shifter.

18. A method for controlling a phase in a wireless device comprising a plurality of antenna; and a plurality of wireless hardware modules that transmit or receive signals via the plurality of antennas, the method comprising:
at each of the plurality of wireless hardware modules,
generating a high-frequency signal, and transmitting or receiving, based on the generated high-frequency signal, a signal via at least one of the plurality of antennas; and
at the wireless device,
obtaining, each time the plurality of wireless hardware modules start generation of a plurality of high-frequency signals, a difference of phases of the plurality of high-frequency signals when a difference of phases of a plurality of signals transmitted or received by the plurality of wireless hardware modules coincides with a reference value, memorizes the obtained difference as a reference difference, and controlling, based on the difference of the phases of the high-frequency signals and the memorized reference difference, at least one phase of a plurality of signals to be transmitted or received by the plurality of wireless hardware modules after memorizing the reference difference.

* * * * *